US012710304B2

(12) United States Patent
Kirst

(10) Patent No.: US 12,710,304 B2
(45) Date of Patent: Aug. 18, 2026

(54) TEST MODULE, TEST SYSTEM AND TEST ARRANGEMENT FOR A BASE MODULE AND/OR A MEASURING SYSTEM ELECTRONICS UNIT OF A MODULAR VIBRATORY MEASURING SYSTEM

(71) Applicant: Endress+Hauser Flowtec AG, Reinach (CH)

(72) Inventor: Michael Kirst, Lörrach (DE)

(73) Assignee: Endress+Hauser Flowtec AG, Reinach (CH)

( * ) Notice: Subject to any disclaimer, the term of this patent is extended or adjusted under 35 U.S.C. 154(b) by 225 days.

(21) Appl. No.: 18/701,125

(22) PCT Filed: Sep. 22, 2022

(86) PCT No.: PCT/EP2022/076349
§ 371 (c)(1),
(2) Date: Apr. 12, 2024

(87) PCT Pub. No.: WO2023/061718
PCT Pub. Date: Apr. 20, 2023

(65) Prior Publication Data

US 2025/0264354 A1 Aug. 21, 2025

(30) Foreign Application Priority Data

Oct. 13, 2021 (DE) ..................... 10 2021 126 587.8
Jan. 5, 2022 (DE) ..................... 10 2022 100 234.9

(51) Int. Cl.
*G01F 25/10* (2022.01)
*G01F 1/84* (2006.01)
*G01F 15/14* (2006.01)

(52) U.S. Cl.
CPC .............. *G01F 25/10* (2022.01); *G01F 15/14* (2013.01); *G01F 1/8422* (2013.01); *G01F 1/8477* (2013.01)

(58) Field of Classification Search
CPC . G01F 1/667; G01F 1/662; G01F 1/74; G01F 1/8413; G01F 1/60; G01F 1/8436;
(Continued)

(56) References Cited

U.S. PATENT DOCUMENTS 10,928,233 B2 * 2/2021 Bitto ..................... G01F 1/8477
11,125,596 B2 * 9/2021 Bitto ..................... G01F 15/02
(Continued)

FOREIGN PATENT DOCUMENTS

CN 118103678 A * 5/2024
DE 102008022373 A1 11/2009
(Continued)

*Primary Examiner* — Andre J Allen
(74) *Attorney, Agent, or Firm* — Christopher R. Powers; Endress+Hauser (USA) Holding, Inc.

(57) ABSTRACT

A test module is designed to be inserted into, and to be releasably mechanically connected to, a base module of a vibratory measuring system, said base module being electrically connected to a measuring system electronics unit. The test module comprises a support element and at least one test element that is mechanically connected to the support element and is intended for generating and/or detecting a magnetic field. The test module can also be used to form a test system and a test arrangement for a base module and/or for a measuring system electronics unit, connected to said base module, of a modular vibratory measuring system. Moreover, the test module or a test system or test arrangement formed thereby can also be used to start up and/or to check or test such a modular vibratory measuring system.

38 Claims, 5 Drawing Sheets

(58) Field of Classification Search

CPC . G01F 1/58; G01F 1/66; G01F 1/8477; G01F 1/849; G01F 1/8409; G01F 15/024; G01F 1/8431; G01F 1/588; G01F 25/10; G01F 1/584; G01F 1/8418; G01F 1/663; G01F 1/3209; G01F 1/8427; G01F 1/8472; G01F 1/8422; G01F 1/586; G01F 1/3218; G01F 1/8486; G01F 1/712; G01F 1/86; G01F 1/002; G01F 15/14; G01F 1/64; G01F 1/00; G01F 1/704; G01F 15/00; G01F 1/3266; G01F 1/8495; G01F 1/668; G01F 5/00; G01F 1/7082; G01F 1/80; G01F 1/708; G01F 1/3227; G01F 1/666; G01F 1/3287; G01F 1/56; G01F 15/18; G01F 1/88; G01F 1/28; G01F 1/34; G01F 1/50; G01F 15/02; G01F 1/6842; G01F 1/8404; G01F 15/08; G01F 1/3259; G01F 1/32; G01F 1/44; G01F 15/185; G01F 1/36; G01F 1/363; G01F 1/84; G01F 15/063; G01F 1/7086; G01F 1/78; G01F 1/684; G01F 1/82; G01F 1/8468; G01F 1/8481; G01F 15/022; G01F 7/00; G01F 1/68; G01F 1/20; G01F 1/8454; G01F 1/7084; G01F 1/325; G01F 1/72; G01F 1/661; G01F 1/7088; G01F 1/056; G01F 1/3282; G01F 15/006; G01F 15/0755; G01F 1/007; G01F 1/76; G01F 1/6845; G01F 1/40; G01F 1/10; G01F 1/115; G01F 1/90; G01F 1/696; G01F 1/3273; G01F 1/42; G01F 23/2962; G01F 15/005; G01F 15/046; G01F 1/7044; G01F 1/125; G01F 15/068; G01F 1/582; G01F 1/8445; G01F 15/04; G01F 1/206; G01F 1/665; G01F 1/6965; G01F 15/06; G01F 1/6847; G01F 1/46; G01F 1/52; G01F 1/7046; G01F 1/075; G01F 1/24; G01F 25/13; G01F 1/06; G01F 1/3236; G01F 13/006; G01F 15/003; G01F 25/0092; G01F 1/844; G01F 3/10; G01F 25/15; G01F 3/00; G01F 3/38; G01F 1/698; G01F 15/043; G01F 15/12; G01F 1/22; G01F 1/692; G01F 25/00; G01F 1/6986; G01F 15/066; G01F 15/10; G01F 3/16; G01F 1/7042; G01F 1/8463; G01F 17/00; G01F 22/00; G01F 1/08; G01F 23/296; G01F 1/30; G01F 1/383; G01F 1/716; G01F 13/00; G01F 1/6888; G01F 15/061; G01F 15/065; G01F 15/075; G01F 3/20; G01F 1/05; G01F 1/688; G01F 9/001; G01F 23/263; G01F 1/7048; G01F 1/8459; G01F 1/845; G01F 23/284; G01F 25/17; G01F 1/103; G01F 1/69; G01F 15/007; G01F 7/005; G01F 15/002; G01F 15/07; G01F 23/292; G01F 5/005; G01F 1/12; G01F 1/54; G01F 23/14; G01F 23/24; G01F 1/065; G01F 23/26; G01F 23/268; G01F 3/30; G01F 1/699; G01F 15/028; G01F 23/266; G01F 23/2965; G01F 23/804; G01F 1/26; G01F 11/00; G01F 9/008; G01F 1/372; G01F 1/48; G01F 15/125; G01F 23/22; G01F 25/11; G01F 9/00; G01F 11/24; G01F 13/008; G01F 23/2968; G01F 25/14; G01F 1/053; G01F 1/6882; G01F 1/6884; G01F 19/00; G01F 22/02; G01F 23/2961; G01F 23/2967; G01F 3/24; G01F 1/375; G01F 11/284; G01F 13/001; G01F 23/18; G01F 23/241; G01F 3/06; G01F 3/08; G01F 3/18; G01F 3/227; G01F 1/005; G01F 1/0755; G01F 1/106; G01F 23/165; G01F 23/2966; G01F 3/04; G01F 3/065; G01F 3/26; G01F 11/086; G01F 11/28; G01F 23/242; G01F 23/265; G01F 23/30; G01F 23/80; G01F 25/12; G01F 1/07; G01F 1/203; G01F 11/029; G01F 11/22; G01F 13/003; G01F 15/001; G01F 15/026; G01F 23/00; G01F 23/0007; G01F 23/02; G01F 23/164; G01F 23/20; G01F 23/245; G01F 23/288; G01F 23/72; G01F 25/0084; G01F 3/221; G01F 3/224; G01F 9/006; G01F 9/023; G01F 1/11; G01F 1/1155; G01F 11/06; G01F 23/246; G01F 23/28; G01F 23/2928; G01F 23/64; G01F 3/02; G01F 3/22; G01F 3/222; G01F 3/228; G01F 3/36; G01F 1/37; G01F 1/377; G01F 1/38; G01F 1/386; G01F 1/6886; G01F 1/6983; G01F 11/006; G01F 11/08; G01F 11/10; G01F 11/32; G01F 15/008; G01F 15/105; G01F 23/0046; G01F 23/04; G01F 23/168; G01F 23/282; G01F 23/44; G01F 23/603; G01F 23/68; G01F 23/802; G01F 23/808; G01F 3/12; G01F 9/005; G01F 1/366; G01F 11/003; G01F 11/021; G01F 11/12; G01F 23/0015; G01F 23/243; G01F 23/247; G01F 23/2927; G01F 23/806; G01F 25/20; G01F 3/225

USPC .......................................... 73/861–861.357

See application file for complete search history.

(56) References Cited

U.S. PATENT DOCUMENTS

| | | | | |
|---|---|---|---|---|
| 11,619,532 | B2 * | 4/2023 | Malani | G01F 15/18 73/861.355 |
| 12,018,966 | B2 * | 6/2024 | Zhu | G01F 15/14 |
| 12,228,438 | B2 * | 2/2025 | Schwenter | G01F 1/8413 |
| 12,442,675 | B2 * | 10/2025 | Kirst | G01F 1/8431 |
| 12,535,350 | B2 * | 1/2026 | Bitto | G01F 1/8409 |
| 2009/0277278 | A1 | 11/2009 | Koudal et al. | |

FOREIGN PATENT DOCUMENTS

| | | | | |
|---|---|---|---|---|
| DE | 102019134604 | A1 | 6/2021 | |
| DE | 102019134606 | A1 | 6/2021 | |
| DE | 102022134029 | A1 * | 6/2024 | G01F 25/10 |
| EP | 2487468 | B1 * | 4/2021 | G01F 1/84 |
| WO | 2013105933 | A1 | 7/2013 | |
| WO | 2018231229 | A1 | 12/2018 | |
| WO | 2019017891 | A1 | 1/2019 | |
| WO | 2021121867 | A1 | 6/2021 | |
| WO | WO-2024200208 | A1 * | 10/2024 | G01F 1/8409 |

* cited by examiner

M2

M1

TEST MODULE, TEST SYSTEM AND TEST ARRANGEMENT FOR A BASE MODULE AND/OR A MEASURING SYSTEM ELECTRONICS UNIT OF A MODULAR VIBRATORY MEASURING SYSTEM

CROSS-REFERENCE TO RELATED APPLICATIONS

The present application is related to and claims the priority benefit of German Patent Application No. 10 2021 126 587.8, filed Oct. 13, 2021, German Patent Application No. 10 2022 100 234.9, filed Jan. 5, 2022, and International Patent Application No. PCT/EP2022/076349, filed Sep. 22, 2022, the entire contents of which are incorporated herein by reference.

TECHNICAL FIELD

The invention relates to a test module for a base module of a (modular) vibronic measuring system and/or for measuring system electronics of the vibronic measuring system electrically connected to the base module, a test system formed by means of such a test module and/or a test arrangement formed by means of such a test system for a base module and/or measuring system electronics of a (modular) vibronic measuring system, for example also for forming a test system or a test arrangement. The invention also relates to a method for commissioning and/or (over) testing a (modular) vibronic measuring system by means of such a test module, such a test system or such a test arrangement.

BACKGROUND

From DE-A 10 2019 134 606, WO-A 2019/017891 or WO-A 2021121867 as well as the (not pre-published) German patent applications DE 102021105397.8, DE 102020133614.4, DE 102020132685.8, DE 102020133851.1, DE 102020133566.0, DE 102020132986.5, DE 102020132686.6, DE 102020132685.8, DE 102020131452.3, DE 102020132223.2, DE 102020127356.8, DE 102020114519.5 or DE 102020112154.7 modular (modular) vibronic measuring systems are known in each case, namely formed by means of a base module, a vibronic module mechanically connected to the base module and measuring system electronics electrically connected to the base module and serving to detect at least one measurement variable of a fluid measuring substance flowing in a (measuring substance) line, namely to determine measured values for one or more measurement variables, for example a mass stream, a volume flow, a density and/or a viscosity, of the measuring substance.

The base module of such a (modular) vibronic measuring system has a (protective) housing with at least one chamber at least partially wrapped by a housing wall and one or more electrical coils, for example cylindrical and/or designed as air coils, which are placed (at a distance from each other) inside the chamber of the (protective) housing and are at least indirectly mechanically connected to the housing wall. Each of the coils is also electrically connected to the measuring system electronics. The measuring system electronics can be housed at least partially inside the (protective) housing and/or at least partially outside the (protective) housing, for example in a separate electronics housing. In particular, the base module is also configured to receive the vibronic module of the measuring system and to be mechanically firmly connected thereto (forming a vibration-type measuring transducer), but nevertheless releasably connected again, in particular to form the vibronic measuring system itself; this is also done in particular in such a manner that the vibronic module is locked in the base module or cannot be moved.

The vibronic module of the respective measuring system is also designed to be replaceable, in such a manner that it can be inserted into the chamber, in particular also on location, from outside the (protective) housing of the base module or through an (insertion) opening of the housing provided in the housing wall, and that it can be removed from the base module again in a non-destructive manner, possibly also without tools, in particular namely from outside the housing and/or can be removed through the (slide-in) opening of the housing or without the base module itself having to be handled or removed from the (process) plant. This also makes it possible, among other things, to insert a vibronic module subsequently on location, i.e., into an already installed base module, or to replace a defective or worn vibronic module on location with an intact new vibronic module, which may only be used once or only for a specified period of time ("disposable"). The vibronic module furthermore has one or more, for example cylindrical, permanent magnets and is furthermore configured to be installed in the base module in such a manner that each of the permanent magnets is placed within the aforementioned chamber, but is nevertheless spaced apart from the housing wall, in particular in such a manner that each of the permanent magnets is held in a static installation position predetermined in each case with respect to an alignment and/or a smallest distance from one of the electrical coils of the base module and that a respective imaginary longitudinal axis of each of the permanent magnets and an imaginary longitudinal axis of at least one of the electrical coils are aligned with one another or run parallel to one another in extension.

In the measuring systems in question, each vibronic module further has at least one (measuring) tube, for example at least partially straight and/or at least partially curved, with a tube wall forming an outer shell surface of the tube, in particular made of a metal or a plastic, and with a lumen wrapped by the same tube wall, in particular two essentially identical parallel (measuring) tubes, and each of the aforementioned permanent magnets is mounted on the outside of the tube wall, in particular at a first segment end and a second segment end, namely two substantially identical parallel (measuring) tubes, and each of the aforementioned permanent magnets is fixed to the outside of the tube wall, in particular to a central segment of the tube wall extending between a first segment end and a second segment end remote therefrom, in particular is connected to the tube wall by means of a material bond. In addition, the vibronic module or its at least one (measuring) tube is designed to be installed in the housing, if necessary without tools, in such a manner that the tube is placed at least partially, in particular completely, within the chamber, but is nevertheless spaced from the housing wall, and that each of the permanent magnets in the respective installation position together with the respective electrical coil form a voice coil, in particular serving as an electrodynamic vibration exciter, and/or a plunger coil, in particular serving as an electrodynamic vibration sensor. In the case of a (measuring) tube that is bent at least in portions, the aforementioned central segment can, for example, be substantially U-shaped or V-shaped. In such a vibronic measuring system, each of the above-mentioned (measuring) tubes is also configured to carry a fluid measuring substance flowing within the lumen during operation, in particular with a predeterminable flow direction and/or flow direction pointing from the first segment end to the second segment end, and to be vibrated in the meantime in order to generate measuring effects correlated with one or more measurement variables of the measuring substance, in particular in such a manner that the central segment performs oscillating movements about a static rest position and/or that the (measuring) tube is driven by means of at least one of the aforementioned (energized) voice coils and/or that an (alternating) voltage representing oscillating movements of the at least one tube and thus serving as an oscillation signal is generated by means of the aforementioned plunger coils. The measuring system electronics of such a measuring system is in turn configured accordingly, by means of an electrical driver signal, in particular with an impressed alternating current and/or an impressed (alternating current) frequency substantially corresponding to a resonant frequency of the at least one tube, to feed electrical power into the at least one electrical coil forming the aforementioned voice coil and/or by means of the (alternating) voltage generated by the at least one electric coil forming the aforementioned plunger coil, to determine measurement values for the one or more measurement variables to be detected for the measured material flowing through the (measuring) tube or tubes, in the case of a measuring apparatus designed as a Coriolis mass flow meter or measuring apparatus designed as a Coriolis mass flow/density measuring apparatus, for example, to generate (mass flow) measured values representing the mass flow on the basis of a (measured) phase difference between two of the aforementioned swing signals and a phase difference to measured value characteristic function set up in the measuring system electronics. The phase difference to measured mass stream characteristic function can, for example, be a (linear) parameter function with a (scale) zero point that corresponds to a (measured) phase difference of the two oscillation signals that can be measured when the measured material is at rest or when the mass stream is zero, and with a slope which corresponds to a (measuring) sensitivity of the measuring system or a change in the (measuring) phase difference related to a change in the mass flow. Since one or more resonance frequencies of the at least one tube are particularly also dependent on the instantaneous density of the respective measured substance, by means of such a measuring system, in addition to the mass stream, the density of the respective measured substance flowing through it can also be measured directly by means of the (alternating current) frequency of the driver signal and/or by means of a (signal) frequency of at least one of the oscillation signals. Accordingly, the measuring system electronics of measuring systems of the type in question are typically further equipped to generate (density) measured values representing the density on the basis of the aforementioned (alternating current) frequency of the driver signal and/or on the basis of a corresponding signal frequency of at least one of the oscillation signals, for example using a characteristic curve function configured accordingly in the measuring system electronics. Furthermore, it is also possible to directly measure the viscosity of the medium flowing through by means of vibronic measuring systems of the type in question, for example, based on an excitation energy or excitation power required to maintain the useful oscillations and/or based on a damping of the excited (resonance) oscillations resulting from a dissipation of oscillation energy or by using a damping-to-measurement characteristic curve function set up accordingly in the measuring system electronics. In addition, further measured variables derived from the aforementioned flow and/or substance parameters, such as the Reynolds number, can be easily determined by means of such vibronic measuring systems.

To simplify the commissioning of a measuring system formed in this manner, the vibronic module may further have at least one identifying element relating to or carrying identifying information about the vibronic module, for example a bar code, QR code or RFID label attached to at least one tube and/or the base module can have at least one light-emitting semiconductor element positioned inside the (protective) housing and connected to the measuring system electronics, for example a light-emitting diode (LED), and/or one or more radio transmitters/receivers (RF transceivers) and/or photosensors, for example one or more CCD photosensors and/or one or more CMOS photosensors, each positioned inside the (protective) housing and connected to the measuring system electronics.

Vibronic measuring systems of the type in question must also be regularly checked for their functional efficiency or any deviations from a respective reference state determined in advance, for example in the state determined by the manufacturer or in the manufacturer's factory and/or during a calibration or commissioning of the respective measuring system on location, for example, in order to be able to detect as early as possible any reductions in the functionality or measuring accuracy of the measuring system associated with increased deviations from the reference state, with which the measuring system ultimately maps the measurement variable to be recorded, not least the mass flow and density, into the corresponding measured values. Such reductions in the functionality or measuring accuracy of such a measuring system can occur, for example, in the form of mostly irreversible changes in the electrical impedance of the above-mentioned swing and/or immersion coils and/or a permanently reduced stability of the mechanical connection between the base module and the vibronic module or the precision of the positioning of the vibronic module in the base module or can be caused, for example, by thermal and/or mechanical overloads, approximately as a result of very high or very low temperatures within the base module, ageing, increased or condensing moisture within the base module and/or wear of components of the base module caused by frequent replacement of vibronic modules. Other influencing factors that at least indirectly and/or at least temporarily impair the functionality of the measuring system include multi-frequency and/or high-frequency electromagnetic (external) radiation or fields (EMC) propagating within the base module or (external) sound waves propagating within the base module, for example in the form of structure-borne sound.

As a result, it must regularly be assumed that one or more of the system functions (transfer functions) inherent in the measuring system, each of which characterizes a functional dependence of the aforementioned vibration signals on the respective driver signal or one or more functional dependencies of the vibration signals on the driver signal and the respective flow and/or material parameters of the measured substance, is also changed in comparison to a (reference) system function inherent in the respective original measuring transducer. Examples of such system functions of the measuring system include a mass flow to phase difference system function, in accordance with which the aforementioned (measuring) phase difference of the oscillation signals is dependent on the mass flow, or a density to resonance frequency system function of the transducer, in accordance with which one or more resonance frequencies of the at least one tube are dependent on the density of the material to be measured. Equally affected by such (over) loading of the measuring transducer are accordingly also the measuring functions of the measuring system involving the aforementioned system functions, in accordance with which the measuring system as a whole converts the respective measurement variable to be recorded into the respective measured values, for example a characteristic curve function composed of the aforementioned mass flow to phase difference system function and a phase difference to mass flow measured value characteristic curve function, namely a characteristic function implemented in the measuring system electronics, in accordance with which a determined phase difference is converted into mass flow measured values, mass flow to measured value measuring function of the measuring system, in accordance with which mass flow measured values determined thereby are dependent on the mass flow. The phase difference-to-mass flow measurement characteristic curve function can, for example, be a (linear) parameter function with a (scale) zero point corresponding to a (measurement) phase difference measured at rest and a (measurement) sensitivity corresponding to a change in the (measurement) phase difference related to a change in the mass flow (slope of the characteristic curve function). Further examples of such system functions that are also potentially affected by interference or measurement functions formed with them include a density-to-resonant-frequency-system function of the transducer or a density-to-measurement-(measurement) function of the measurement system involving this and a resonant-frequency-to-density-characteristic function of the measurement system electronics and/or a viscosity-to-damping-system function of the transducer or a viscosity-to-measured-value-(measuring) function of the measuring system involving this and a damping-to-viscosity-measured-characteristic function of the measuring system electronics. The change in the respective system function can accordingly have an effect, for example, as a drift of one or more of the respective characteristic curve parameters of one or more of the aforementioned characteristic curve functions, in the case of a linear parameter function, for example, of its zero point and/or its slope. The above-mentioned, possibly also irreversible changes to one or more of the system or measuring functions of the measuring system can occasionally also lead to the measuring system as a whole working incorrectly to such an extent that the high measuring accuracy typically aimed for in such measuring systems is no longer guaranteed, meaning that the functionality of the measuring system is considerably impaired, possibly even suspended, or that there is a correspondingly critical malfunction of the affected measuring system.

Taking this into account, measuring systems of the type in question are typically subjected to corresponding (re-)inspections, for example at regular intervals in the course of regular predictive maintenance; in such a manner that the functionality of the vibronic module or the totality of the measuring system is checked on location in the course of a time-controlled (self-)diagnosis carried out by means of the measuring system and/or triggered by corresponding control commands transmitted to the measuring system electronics, approximately in order to be able to initiate appropriate repair or replacement measures as quickly as possible if necessary, not least when a malfunction of the measuring system is detected. In the case of a vibronic measuring system of the type in question, such a (repair or replacement) measure regularly involves replacing the defective vibronic module with a new vibronic module, which can also be carried out quickly and easily on location. However, one disadvantage of a test procedure in such a manner is that only the functionality of the measuring system as a whole can be verified or, conversely, that any malfunction detected cannot be localized exactly within the measuring system, i.e., assigned to the base module, the vibronic module or the measuring system electronics. In particular, it is not readily possible with such a (self-)diagnosis to identify malfunctions of the base module or the measuring system electronics electrically connected to it which merely impair the measuring accuracy, in such a manner that a need to replace the base module and/or the measuring system electronics can also be determined in the course of such a check of a measuring system of the type in question.

SUMMARY

Based on the aforementioned prior art, one object of the invention is to improve the checking of modular vibronic measuring systems in such a manner that any malfunctions or defects of the base module and/or the measuring system electronics, not least also signs of wear or ageing of the base module or the measuring system electronics which reduce the measuring accuracy of the measuring system as a whole, can be detected as early and reliably as possible and, if necessary, also reported.

In order to achieve this object, the invention consists of a test module for a base module of a (modular) vibronic measuring system, in particular a modular Coriolis mass stream measuring apparatus, and/or for an electronic measuring system of the vibronic measuring system electrically connected to the base module, for example also for forming a test system or a test arrangement, using such a test module for testing a base module of a vibronic measuring system, in particular a modular Coriolis mass stream measuring apparatus, and/or measuring system electronics of the vibronic measuring system which are electrically connected to the base module. According to the invention, the test module comprises a carrier element, for example monolithic and/or plate-shaped, for example made of metal and/or plastic, and at least one first test element, for example an electric and/or magnetic and/or electronic test element, for example an electric coil and/or a permanent magnet, mechanically connected to the carrier element for generating and/or detecting a magnetic field. In addition, the test module according to the invention is configured to be inserted into the base module and to be releasably mechanically connected thereto again, in particular in such a manner that the test module is locked in the base module or is not movable and/or that the first test element is held within the base module at a first predetermined test position.

The invention further comprises a test system formed by means of a test module according to the invention and a test system electronics, for example also modular, electrically connected to the same test module or to its first test element, for testing a base module of a (modular) vibronic measuring system, for example namely a modular Coriolis mass stream measuring apparatus, and/or a measuring system electronics of the vibronic measuring system electrically connected to the base module, for example also modular, or the invention also consists in using such a test system for testing a base module of a (modular) vibronic measuring system, in particular a modular Coriolis mass stream measuring apparatus, and/or a measuring system electronics of the vibronic measuring system electrically connected to the base module, in particular modular.

The invention further comprises a test arrangement formed by means of such a test system for a base module and a measuring system electronics of a (modular) vibronic measuring system, for example a modular Coriolis mass stream measuring apparatus, wherein the base module has a (protective) housing with at least one chamber at least partially wrapped by a housing wall and at least one, for example cylindrical, (first) electrical coil placed inside the chamber of the (protective) housing, which is at least indirectly mechanically connected to the housing wall, and wherein the test module is inserted into the base module and is mechanically fixedly connected thereto, but nevertheless releasably connected again, in such a manner that the carrier element and the first test element are placed within the chamber, for example also in such a manner that the test module is locked in the base module or is not movable and/or that the first test element is held at a first test position predetermined with respect to an alignment and/or a smallest distance to the first electrical coil.

Furthermore, the invention also comprises a method for commissioning and/or (over)testing a (modular) vibronic measuring system, for example a modular Coriolis mass stream measuring apparatus, wherein the measuring system comprises a base module which has a (protective) housing with at least one chamber which is at least partially wrapped by a housing wall and at least one first electrical coil which is placed inside the chamber of the (protective) housing, is for example cylindrical and/or designed as an air coil, is at least indirectly mechanically connected to the housing wall and is electrically connected to the measuring system electronics, and a vibronic system and wherein the base module is configured to receive the vibronic module and to be mechanically fixedly, yet releasably, connected thereto, for example by forming a vibration-type measuring sensor or a vibronic measuring system and/or in such a manner that the vibronic module is locked within the base module or is not movable, in which method the test module or test system is used to form the test arrangement and to check the base module and/or the measuring system electronics by means of the test module or the test system, for example by comparing at least one measured value determined by means of the test system electronics and/or at least one measured value determined by means of the measuring system electronics with a respectively associated reference value and/or at least one threshold value predetermined therefor. In the method according to the invention, the test module is also removed from the base module and a vibronic module is then inserted into the base module to form a vibration-type measuring sensor or vibronic measuring system.

According to a first embodiment of the test module of the invention, the test module is further configured to be inserted into the base module and to be detachably mechanically connected thereto again in such a manner that the first test element is held at a first test position which is predetermined in particular with respect to an alignment and/or a smallest distance of an electrical coil of the base module, for example also in such a manner that an imaginary longitudinal axis of the first test element and an imaginary longitudinal axis of an electrical coil of the base module are aligned with one another or extend parallel to one another in extension.

According to a second embodiment of the test module of the invention, it is further provided that the first test element has an electrical coil, in particular a cylindrical coil and/or designed as an air coil.

According to a third embodiment of the test module of the invention, it is further provided that the first test element has a permanent magnet.

According to a fourth embodiment of the test module of the invention, it is further provided that the first test element has a Hall sensor, in particular a CMOS Hall sensor.

According to a fifth embodiment of the test module of the invention, it is further provided that the carrier element is at least partially produced from a plastic, for example also chemically resistant and/or high-strength, such as a polycarbonate (PC) or a polyetheretherketone (PEEK), for example namely has an outer protective layer produced from plastic. Further forming this embodiment of the invention, it is further provided that at least the first test element is at least partially, or possibly even completely, embedded in the plastic.

According to a sixth embodiment of the test module of the invention, it is further provided that the base module has a (protective) housing with at least one chamber which is at least partially wrapped by a housing wall and at least one first electrical coil which is placed inside the chamber of the (protective) housing, for example also cylindrical and/or electrically connected to the measuring system electronics, and which is at least indirectly mechanically connected to the housing wall, and in that the test module is configured to be inserted into the base module and to be detachably mechanically connected thereto again in such a manner that the carrier element and the first test element are placed within the chamber, for example also in such a manner that the first test element is held at a first test position predetermined with respect to an alignment and/or a smallest distance to the first electrical coil, and/or that an imaginary longitudinal axis of the first test element and an imaginary longitudinal axis of the first electrical coil are aligned with one another or extend parallel to one another as an extension. Further forming this embodiment of the invention, it is further provided that the base module has at least one second electrical coil which is placed inside the chamber of the (protective) housing, for example also cylindrical and/or identical in construction to the first electrical coil, and which is at least indirectly mechanically connected to the housing wall, for example also positioned at a distance from the first electrical coil. Furthermore, the base module can also have at least one third electrical coil placed inside the chamber of the (protective) housing, for example cylindrical and/or identical in construction to the first and/or second electrical coil, which is at least indirectly mechanically connected to the housing wall, for example positioned at a distance from the first and second electrical coils.

According to a seventh embodiment of the test module of the invention, it is further provided that the first test element is configured to generate a time-varying electrical test signal, in particular with an alternating voltage dependent on the magnetic field and/or an alternating current dependent on the magnetic field, by means of a magnetic field interacting with the first test element with a time-varying magnetic field strength and/or a time-varying magnetic flux density.

According to a first further development of the test module of the invention, this further comprises: at least one environmental sensor, for example a sound receiver (microphone), a temperature sensor, a (micro) bolometer, a thermopile, a humidity sensor, a radiation detector or an antenna, mechanically connected to the carrier element and spaced apart from the first test element, for example an antenna, for detecting at least one physical environmental measurement variable within the base module, for example multi- and/or high-frequency electromagnetic (interference) radiation (EMC) propagating within the base module, sound waves propagating within the base module, thermal radiation propagating within the base module, a temperature within the base module or a humidity within the base module, and for converting the said (detected) environmental measurement variable into an environmental measurement signal.

According to a second further development of the test module of the invention, the test module further comprises: at least one identification element, for example a bar code label, a QR code label or a radio label (RFID TAG), which is mechanically connected to the carrier element and carries, for example, information relating to or identifying the test module.

According to a third further development of the test mode of the invention, this further comprises: at least one light-emitting semiconductor element, in particular a light-emitting diode (LED), mechanically connected to the carrier element.

According to a fourth further development of the test module of the invention, the test module further comprises: one or more photosensors mechanically connected to the carrier element, in particular one or more CCD photosensors and/or one or more CMOS photosensors.

According to a fifth further development of the test module of the invention, this further comprises: at least one second test element for generating and/or detecting a magnetic field, which is mechanically connected to the carrier element and, for example, is also identical in construction to the first test element and/or is functionally identical to the first test element and/or is spaced apart from the first test element. The test module is further configured to be inserted into the first base module and to be detachably mechanically connected thereto again in such a manner that the second test element is placed within the chamber, for example also in such a manner that the second test element is held at a second test position which is predetermined with respect to an alignment and/or a smallest distance from the second electrical coil and/or is spaced apart from the first test position, and/or that an imaginary longitudinal axis of the second test element and an imaginary longitudinal axis of the second electrical coil are aligned with one another or extend parallel to one another in extension. Furthermore, the test module can comprise at least one third test element for generating and/or detecting a magnetic field, which is mechanically connected to the carrier element and, for example, is identical in construction to the first and/or second test element and/or is functionally identical to the first and/or second test element and/or is spaced apart from the first and second test elements.

According to a first embodiment of the test system of the invention, it is further provided that the test system electronics are fastened, in particular rigidly and/or releasably, to the test module, in particular to its carrier element.

According to a second embodiment of the test system of the invention, it is further provided that the test system electronics are arranged at least in part within the carrier element of the test module.

According to a third embodiment of the test system of the invention, it is further provided that the test system electronics can be disconnected again and/or electrically connected to the test module via a connecting cable.

According to a fourth embodiment of the test system of the invention, it is further provided that the test system electronics have at least one non-volatile storage for storing digital measurement and/or operating data, in particular digital reference values for a voltage and/or a current of an electrical drive signal fed into the first electrical coil by means of the test system electronics and/or for an inductance of the first electrical coil and/or of one or more electronic certificates of the test system and/or of the measuring system.

According to an eighth embodiment of the test mode of the invention, it is further provided that the first test element is configured to generate a (test) magnetic field with time-varying magnetic field strength or time-varying magnetic flux density by means of an injected time-varying electrical drive signal, in particular with an impressed alternating voltage or an impressed alternating current.

According to a fifth embodiment of the test system of the invention, it is further provided that its test module comprises at least one second test element for generating and/or detecting a magnetic field, which second test element is mechanically connected to the carrier element and, for example, is also identical in construction to the first test element and/or is functionally identical to the first test element and/or is spaced apart from the first test element, and that the test system electronics are configured to pick up and evaluate the electrical test signal from the second test element, in particular representing a magnetic field interacting with the second test element.

According to a sixth embodiment of the test system of the invention, the first test element (of the test module) is configured to generate a time-varying electrical test signal, for example with an alternating voltage and/or an alternating current dependent on the magnetic field, by means of a magnetic field interacting with the first test element with time-varying magnetic field strength and/or time-varying magnetic flux density, and, in addition, the test system electronics are configured to pick up and evaluate the electrical test signal from the first test element, for example to determine an (alternating) voltage and/or an (alternating) current of an electrical drive signal fed into the first electrical coil by means of the measuring system electronics and/or to determine an inductance of the first electrical coil (of the base module).

According to a seventh embodiment of the test system of the invention, it is further provided that the test system electronics has a radio unit, in particular for transmitting (test system) data and/or for receiving (measuring system) data.

According to an eighth embodiment of the test system of the invention, it is further provided that the test module is configured to be inserted into the base module, in particular namely is inserted into the base module.

According to a ninth embodiment of the test system of the invention, it is further provided that the test system electronics are configured to be electrically connected to the measuring system electronics, in particular namely electrically connected to the measuring system electronics.

According to a tenth embodiment of the test system of the invention, it is further provided that the test system electronics have at least one data output for outputting (test system) data, in particular digital data and/or data linked to a time stamp, in particular measuring and/or operating data determined internally by the test system electronics and/or setting parameters generated internally by the test system electronics and/or control commands for the test system electronics.

According to an eleventh embodiment of the test system of the invention, it is further provided that the test system electronics have at least one data input for receiving (measuring system) data, in particular digital data and/or data linked to a time stamp, in particular measuring and/or operating data determined internally by the measuring system electronics and/or setting parameters generated internally by the measuring system electronics and/or control commands for the test system electronics.

According to a twelfth embodiment of the test system of the invention, it is further provided that the test system electronics is configured to feed electrical power into the first test element by means of a (first) electrical (test system) driver signal, for example with an impressed alternating current or with an impressed alternating voltage and/or with a predetermined and/or predeterminably variable signal frequency and/or with a signal frequency corresponding to a mechanical resonance frequency of the base module and/or with a predetermined and/or predeterminably variable phase angle, for example for generating a (test) magnetic field and/or in such a manner that the (first) electrical (test system) driver signal has an amplitude and/or frequency characteristic which simulates a disturbance of a measured substance to be detected by means of the measuring system. This embodiment of the invention further provides that the test module comprises at least one second test element for generating and/or detecting a magnetic field, which is mechanically connected to the carrier element and, for example, is also identical in construction to the first test element and/or is functionally identical to the first test element and/or is spaced apart from the first test element, and in that the test system electronics are configured to feed electrical power into the second test element, in particular for generating a (test) magnetic field, by means of a (second) electrical (test system) driver signal, in particular with an impressed alternating current or with an impressed alternating voltage and/or with a predetermined and/or predeterminably variable signal frequency and/or with a signal frequency corresponding to a mechanical resonance frequency of the base module and/or with a predetermined and/or predeterminably variable phase angle. The test system electronics may further be configured to provide the first and second (test system) driver signals simultaneously, for example in such a manner that the first and second (test system) driver signals have the same signal frequency and/or that a predetermined and/or predeterminably variable test phase difference, namely a difference between a phase angle of the first and a phase angle and second (test system) driver signals of the test system electronics, is set at least temporarily between the first and second test system driver signals. In addition to this, the measuring system electronics can further be configured to determine and evaluate (parameter) measured values for the test phase difference, for example also to compare one or more (parameter) measured values for the test phase difference with a previously determined (parameter) reference value and/or one or more threshold values predetermined for this purpose. Alternatively or in addition, the test system electronics can also be configured to provide the (first) electrical (test system) driver signal in conjunction with the measuring system electronics and/or with a signal frequency corresponding to a mechanical resonance frequency of the base module and/or the measuring system electronics can be configured to use the first test signal generated by means of (first) electrical (test system) driver signals to calculate (simulation) measured values for at least one simulation variable simulating a measurement variable, for example a mass stream and/or a density and/or a viscosity, and/or a disturbance of a flowing fluid. Further, measuring system electronics can also be configured to compare one or more of the aforementioned (simulation) measured values with (simulation) reference values corresponding to the (first) electrical (test system) driver signal and/or one or more threshold values specified for this purpose.

According to a thirteenth embodiment of the test system of the invention, it is further provided that the base module is configured to receive (instead of the test module) a vibronic module of the measuring system and to be connected thereto in a mechanically fixed, yet detachable manner.

According to a fourteenth embodiment of the test system of the invention, the base module is configured to receive (instead of the test module) a vibronic module of the measuring system and to be connected thereto in a mechanically fixed, yet detachable manner, and the test system electronics are also configured to feed electrical power into the first test element by means of a (first) electrical (test system) driver signal, for example with an impressed alternating current or with an impressed alternating voltage and/or with a predetermined and/or predeterminably variable signal frequency and/or a signal frequency corresponding to a (nominal) mechanical resonance frequency of the vibronic module. This embodiment of the invention further provides that the test system electronics are configured, for example in conjunction with the measuring system electronics, to provide the (first) electrical (test system) driver signal with an amplitude and/or frequency characteristic which simulates a disturbance of the vibronic module, and/or that the measuring system electronics are configured to calculate (simulation) measured values for at least one simulation variable simulating a disturbance of the vibronic module by means of the first test signal generated by means of the (first) electrical (test system) driver signal, for example to compare it with (simulation) reference values corresponding to the (first) electrical (test system) driver signal and/or one or more threshold values predetermined for this purpose.

According to a fifteenth embodiment of the test system of the invention, it is further provided that the first electrical coil is electrically connected to the measuring system electronics. This embodiment of the invention further configures the measuring system electronics to detect and evaluate a first electrical (alternating) voltage from the first electrical coil, for example inductively coupled into the first electrical coil by means of the first test element, or induced in the first electrical coil, for example also using the first (alternating) voltage to determine (parameter) measured values for an amplitude, a frequency, a phase angle and/or another parameter of the first (alternating) voltage or to determine such (parameter) measured values and to compare them with a previously determined (parameter) reference value and/or one or more threshold values predetermined therefor. Alternatively or additionally, the measuring system electronics may further be configured to determine measured values for at least one measurement variable of a flowing fluid measuring substance and/or an inductance of the first electrical coil, for example also in order to compare the determined inductance of the first electrical coil with a previously determined (inductance) reference value and/or one or more threshold values predetermined for this purpose.

According to a sixteenth embodiment of the test system of the invention, it is further provided that the measuring system electronics are configured to feed electrical power into the first electrical coil by means of a (first) electrical (measuring system) driver signal, in particular with an impressed alternating current.

According to a seventeenth embodiment of the test system of the invention, it is further provided that the base module has at least one second electrical coil which is placed within the chamber of the (protective) housing, for example cylindrical and/or designed as an air coil and/or identical in construction to the first electrical coil, and which, positioned in particular at a distance from the first electrical coil, is at least indirectly mechanically connected to the housing wall, and that the second electrical coil is electrically connected to the measuring system electronics. In this embodiment of the invention, the measuring system electronics are further configured to feed electrical power into the first electrical coil by means of a first electrical (measuring system) driver signal, for example with an impressed alternating current, and to feed electrical power into the second electrical coil by means of a second electrical (measuring system) driver signal, for example with an impressed alternating current. Alternatively or in addition, the measuring system electronics can further be configured to detect and evaluate a second electrical (alternating) voltage from the first electrical coil, for example inductively coupled from the first test element into the first electrical coil or induced in the second electrical coil, for example, using the first (alternating) voltage to determine (parameter) measured values for an amplitude and/or a frequency and/or a phase angle and/or another parameter of the second (alternating) voltage and/or an inductance of the first electric coil and/or measured values for at least one measurement variable of a flowing fluid, and/or the measuring system electronics can also be configured to detect and evaluate a second electrical (alternating) voltage from the second electrical coil, for example inductively coupled into the second electrical coil by a second test element of the test module or induced in the second electrical coil, for example, using the second (alternating) voltage to determine (parameter) measurement values for an amplitude and/or a frequency and/or a phase angle and/or another parameter of the second (alternating) voltage and/or an inductance of the second electric coil and/or measurement values for at least one measurement variable of a flowing fluid and/or the measuring system electronics can further be configured to determine a phase difference established between the first and second (alternating) voltages, for example in order to use it to determine measurement values for a mass stream and/or another measurement variable of a flowing fluid. Furthermore, the measuring system electronics can be further configured to compare one or more of the (parameter) measured values with a (parameter) reference value determined in advance and/or one or more predetermined threshold values.

According to an eighteenth embodiment of the test system of the invention, it is further provided that the test system electronics are configured to detect and evaluate an electrical (alternating) voltage from the first test element, in particular inductively coupled into the first test element by means of the first electrical coil or induced in the first test element, for example namely to determine (parameter) measured values for an amplitude and/or a frequency and/or a phase angle and/or another parameter of the first (alternating) voltage and/or for an inductance of the first electrical coil using the (alternating) voltage. This embodiment of the invention further configures the test system electronics to obtain at least one (parameter) measured value for a voltage level of the first test element by means of an electrical (alternating) voltage applied to the first test element, for example inductively coupled into the first test element by means of the first electrical coil (of the base module) or induced in the first test element and/or a current strength and/or a frequency and/or another (signal) parameter of an electrical (measuring system) driver signal fed into the first electrical coil by means of the measuring system electronics and/or to determine an inductance of the first electrical coil. Furthermore, the measuring system electronics can be further configured to compare one or more of the (parameter) measured values for the at least one (signal) parameter of the (measuring system) driver signal and/or the determined inductance of the first electrical coil with a (parameter) reference value determined in advance in each case and/or one or more threshold values predetermined in each case for this purpose.

According to a nineteenth embodiment of the test system of the invention, it is further provided that the measuring system electronics and the test system electronics are configured to communicate with one another via a data line and/or by radio, for example in order to execute a test program (pre) configured for the test arrangement in an automated manner and/or in dialog with a user of the test arrangement.

According to a twentieth embodiment of the test system of the invention, it is further provided that the measuring system electronics has a radio unit, in particular for transmitting (measuring system) data and/or for receiving (test system) data, and that the test system electronics has a radio unit, for example for transmitting (test system) data and/or for receiving (measuring system) data.

According to a twenty-first embodiment of the test system of the invention, it is further provided that the measuring system electronics have at least one data output for outputting (measuring system) data, for example digital data and/or data linked to a time stamp, for example namely measuring and/or operating data determined internally by the measuring system electronics and/or setting parameters generated internally by the measuring system electronics and/or control commands for the test system electronics. This embodiment of the invention further provides that the test system electronics has a data input for receiving, for example, digital (measuring system) data, namely, for example, measuring and/or operating data determined internally by the measuring system electronics and/or setting parameters and/or control commands generated internally by the measuring system electronics for the test system electronics, and that the data input of the test system electronics is connected to the data output of the measuring system electronics. Furthermore, the measuring system electronics can be further configured to transmit (measuring system) data, for example measurement and/or operating data determined internally by the measuring system electronics and/or setting parameters generated internally by the measuring system electronics and/or control commands for the test system electronics, to the test system electronics via data output and the test system electronics can also be configured to receive and evaluate said (measuring system) data.

According to a twenty-second embodiment of the test system of the invention, it is further provided that the measuring system electronics have at least one data input for receiving, for example, digital (test system) data, for example, namely measuring and/or operating data determined internally by the test system electronics and/or setting parameters and/or control commands generated internally by the test system electronics for the measuring system electronics. This embodiment of the invention further provides that the test system electronics has a data output for outputting (test system) data, for example digital data and/or data linked to a time stamp, for example namely measuring and/or operating data determined internally by the test system electronics and/or setting parameters and/or control commands generated internally by the test system electronics for the measuring system electronics, and that the data output of the test system electronics is connected to the data input of the measuring system electronics. Furthermore, the test system electronics can also be configured to transmit (test system) data, for example measuring and/or operating data determined internally by the test system electronics and/or setting parameters generated internally by the test system electronics and/or control commands for the measuring system electronics, to the measuring system electronics via data output, and the measuring system electronics can further be configured to receive and evaluate said (test system) data.

According to a twenty-third embodiment of the test system of the invention, the test module has at least one identification element, such as a bar code label, a QR code label or a radio label (RFID TAG), which is mechanically connected to the carrier element and, for example, carries information relating to or identifying the test module, and the measuring system electronics are configured to read information carried by the identification element of the test module from the identification element, for example, to evaluate it.

According to a twenty-fourth embodiment of the test system of the invention, it is further provided that the test module comprises at least one environmental sensor, for example an acoustic receiver (microphone), a temperature sensor, a (micro) bolometer, a thermopile, a humidity sensor, a radiation detector or an antenna, mechanically connected to the carrier element and spaced apart from the first test element, for detecting at least one physical environmental measurement variable within the base module, in particular of multi-frequency and/or high-frequency electromagnetic (interference) radiation (EMC) propagating within the base module, of sound waves propagating within the base module, of thermal radiation propagating within the base module, of a temperature within the base module or of a humidity within the base module, and for converting the said (detected) environmental measurement variable into an environmental measurement signal, and in that the test system electronics are configured to receive and evaluate the environmental measurement signal, for example to determine measurement variables for the at least one environmental measurement variable.

According to a twenty-fifth embodiment of the test system of the invention, the first test element (of the test module) has an electrical coil, in particular cylindrical and/or designed as an air coil, and the test module is also inserted into the base module in such a manner that the first test element is held at a first test position predetermined with respect to an orientation and/or a smallest distance from the first electrical coil, forming a transmitter.

According to a twenty-sixth embodiment of the test system of the invention, the first test element (of the test module) has a permanent magnet and the test module is also inserted into the base module in such a manner that the first test element is held at a first test position predetermined with respect to an orientation and/or a smallest distance from the first electrical coil, forming a magnetic coil.

According to a twenty-seventh embodiment of the test system of the invention, the base module is configured to receive a vibronic module of the measuring system and to be connected thereto in a mechanically fixed, but nevertheless releasable manner, for example by forming a measuring transducer of the vibration type or a vibronic measuring system and/or in such a manner that the vibronic module is locked in the base module. This embodiment of the invention further provides that the vibronic module is designed to be replaceable, in such a manner that it can be brought into the chamber from outside the (protective) housing of the base module and/or through an (insertion) opening of the (protective) housing provided in the housing wall and that it can be removed again from the base module, in particular non-destructively and/or without tools, for example namely from outside the housing and/or can be removed through the (insertion) opening of the (protective) housing. Accordingly, the base module may be configured to receive the vibronic module if the test module is not inserted into the base module, or to receive the test module if the vibronic module is not inserted into the base module, and/or the base module may be configured to be assembled with the vibronic module and/or the test module without tools.

According to a twenty-eighth embodiment of the test system of the invention, the base module is configured to receive a vibronic module of the measuring system and to be connected thereto in a mechanically fixed but nevertheless detachable manner, for example forming a measuring transducer of the vibration type or a vibronic measuring system and/or in such a manner that the vibronic module is locked within the base module or cannot be moved, that the vibronic module is locked within the base module or is not movable, and the test module is configured, for example in the same way as the vibronic module, to be installed in the base module, in particular to be inserted from outside the housing and/or through an (insertion) opening of the (protective) housing provided in the housing wall. This embodiment of the invention further provides that the base module has at least one (first) electrical coil placed within the chamber of the (protective) housing, for example cylindrical and/or designed as an air coil, which is at least indirectly mechanically connected to the housing wall and subsequently electrically connected to the measuring system electronics, and in that the measuring system electronics are further configured to feed electrical power into the first electrical coil by means of a first electrical (measuring system) driver signal, for example with an impressed alternating current, for example namely the (first) electrical (measuring system) driver signal with a signal frequency corresponding to a mechanical resonance frequency of the vibronic module, and/or it is provided that the vibronic module has at least one, in particular cylindrical, first permanent magnet. Further, the vibronic module may be further configured to be installed in the base module in such a manner that the aforementioned (first) permanent magnet (of the vibronic module) is placed within the chamber, yet spaced from the housing wall, for example, is held in a static (first) installation position which is predetermined and/or corresponds to the first test position with respect to an alignment and/or a minimum distance from the aforementioned (first) electric coil (of the base module) and/or in such a manner that an imaginary longitudinal axis of the (first) permanent magnet and an imaginary longitudinal axis of the (first) electric coil are aligned with one another or extend parallel to one another as an extension.

According to a twenty-ninth embodiment of the test system of the invention, the base module is configured to receive a vibronic module of the measuring system and to be connected thereto in a mechanically fixed, but nevertheless releasable manner, for example by forming a measuring transducer of the vibration type or a vibronic measuring system and/or in such a manner that the vibronic module is locked in the base module, wherein the vibronic module (of the measuring system) has at least one (first) tube, for example at least partially straight and/or at least partially curved, with a tube wall forming an outer shell surface of the tube, for example made of a metal or a plastic, and with a lumen wrapped by the same tube wall, and wherein the vibronic module is configured, for example without tools, to be installed in the (protective) housing (of the base module)

in such a way that the at least one tube is placed at least partially or completely within the chamber, but is nevertheless spaced apart from the housing wall. This embodiment of the invention further provides that the first tube is designed to be U-shaped or V-shaped at least in sections and/or is configured to guide a fluid measuring substance flowing in its lumen, in particular with a predeterminable flow direction and/or a flow direction pointing from a first segment end (on the inlet side) to a second segment end (on the outlet side), and/or to guide the measuring substance and to vibrate it in the process. Alternatively or additionally, the vibronic module can also have at least one second tube, for example of the same construction and/or function as the first tube, with a tube wall forming an outer shell surface of the second tube, for example made of a metal or a plastic or of the same material as the tube wall of the first tube, and with a lumen wrapped by the same tube wall, for example with a second permanent magnet fixed to the outside of the tube wall.

According to a thirtieth embodiment of the test system of the invention, the base module is configured to receive a vibronic module of the measuring system and to be connected thereto in a mechanically fixed, yet detachable manner, for example by forming a measuring sensor of the vibration type or a vibronic measuring system and/or in such a manner that the vibronic module is locked in the base module, wherein the vibronic module (of the measuring system) comprises at least one (first) tube, for example at least partially straight and/or at least partially curved, with a tube wall forming an outer shell surface of the tube, for example made of a metal or a plastic, and with a lumen wrapped by the same tube wall, and at least one, for example cylindrical, first permanent magnet which is fixed on the outside of the tube wall, for example on a central segment of the tube wall extending between a first segment end and a second segment end remote therefrom, for example is connected to the tube wall by a material bond, and wherein the vibronic module is configured, for example without tools, to be installed in the (protective) housing (of the base module) in such a way that the at least one tube is placed at least partially or completely within the chamber, but is nevertheless spaced apart from the housing wall. This embodiment of the invention further provides that the base module has at least one (first) electrical coil placed within the chamber of the (protective) housing, for example cylindrical and/or designed as an air coil, which is at least indirectly mechanically connected to the housing wall and subsequently electrically connected to the measuring system electronics, and/or that the vibronic module is configured to be installed in the base module in such a manner that the aforementioned (first) permanent magnet (of the vibronic module) is placed inside the chamber, but is nevertheless spaced apart from the housing wall, for example, is held in a static (first) installation position which is predetermined and/or corresponds to the first test position with respect to an alignment and/or a smallest distance to the aforementioned (first) electric coil (of the base module) and/or in such a manner that an imaginary longitudinal axis of the (first) permanent magnet and an imaginary longitudinal axis of the (first) electric coil are aligned with one another or extend parallel to one another in extension. For example, the (first) permanent magnet (of the vibronic module) can also be configured to form, in the installed position together with the first electrical coil (of the base module), a voice coil, in particular serving as an electrodynamic vibration exciter, and/or a plunger coil, in particular serving as an electrodynamic vibration sensor. Further, the (first) tube can be configured to have a fluid measuring substance flowing through it and to be vibrated in the meantime, for example driven by an oscillation exciter formed by means of the first electrical coil and the first permanent magnet, for example in such a manner that at least the aforementioned central segment of the tube wall performs oscillation movements about a static rest position or that an (alternating) voltage induced in the (first) electrical coil represents oscillation movements of the (first) tube. Using the first (alternating) voltage measurement values, the measuring system electronics can, for example, also determine measurement values for at least one measurement variable of the medium flowing through the first tube. Furthermore, the vibronic module can have a second permanent magnet (remote from the first permanent magnet) fixed to the first tube, for example its central segment, and in particular connected to it by a material bond.

According to a thirty-first embodiment of the test system of the invention, the base module has at least one second electrical coil which is placed within the chamber of the (protective) housing, for example cylindrical and/or designed as an air coil and/or identical in construction to the first electrical coil, and which, positioned in particular at a distance from the first electrical coil, is at least indirectly mechanically connected to the housing wall, the second electrical coil is electrically connected to the measuring system electronics, and the base module is further configured to receive a vibronic module of the measuring system and to be mechanically firmly, yet detachably, connected thereto, for example by forming a measuring sensor of the vibration type or a vibronic measuring system and/or in such a manner that the vibronic module is locked in the base module, and the test module is configured, for example in the same manner as the vibronic module, to be inserted into the base module, in particular from outside the housing and/or through an (insertion) opening of the (protective) housing provided in the housing wall. This embodiment of the invention further provides that the vibronic module has a first permanent magnet, for example cylindrical, and at least one second permanent magnet, for example cylindrical and/or identical in construction to the first permanent magnet, for example a second permanent magnet and a third permanent magnet. Further, the vibronic module may be configured to be installed in the base module such that the (first) permanent magnet (of the vibronic module) is placed within the chamber, but is nevertheless spaced from the housing wall, for example in a static first apparatus position which is predetermined with respect to an orientation and/or a smallest distance to the first electrical coil (of the base module) and/or corresponds to the first test position, and/or in such a manner that an imaginary longitudinal axis of the first permanent magnet and an imaginary longitudinal axis of the first electric coil are aligned with one another and/or extend parallel to one another and/or the vibronic module can also be configured to be installed in the base module in such a manner that the second permanent magnet (of the vibronic module) is placed inside the chamber, but is nevertheless spaced apart from the housing wall, for example, namely in a static second installation position which is predetermined with respect to an alignment and/or a smallest distance from the second electrical coil (of the base module) and/or is remote from the first installation position and/or corresponds to the second test position, and/or in such a manner that an imaginary longitudinal axis of the second permanent magnet and an imaginary longitudinal axis of the second electrical coil are aligned with one another or extend parallel to one another as an extension.

According to one embodiment of the method of the invention, forming the test arrangement further comprises inserting the test module into the base module, for example (immediately) after a vibronic module has been removed from the base module.

According to a further development of the method of the invention, this further comprises integrating the test arrangement into a superordinate electronic data processing system. The data processing system can also be formed, for example, by means of a programmable logic controller (PLC) and/or by means of a process control system (PCS) and/or by means of an edge (computing) device and/or by means of a cloud (computing) system.

One of the basic ideas of the invention is to use the installation space provided by the respective base module of a modular vibronic measuring system for a vibronic module installed in (normal) measuring operation also for occasionally accommodating a test module, possibly also connected to a test system electronics, instead of such a vibronic module, so that the test module is installed in the same way as the respective vibronic module with the base module for the purpose of forming a test arrangement. One advantage of the invention is that it allows a base module or measuring system electronics of a modular vibronic measuring system to be checked in a very simple manner on location, in particular also in situ or without having to remove the already installed base module or the already installed measuring system electronics. In the case of vibronic modules to be used only once or only for a specified period of time ("single-use"), such a check can also be carried out advantageously as part of a planned or regular replacement of the vibronic module previously installed in the respective base module with a new vibronic module.

BRIEF DESCRIPTION OF THE DRAWINGS

The invention as well as advantageous embodiments thereof are explained in more detail below based upon exemplary embodiments shown in the figures of the drawing. Identical or identically acting or identically functioning parts are provided with the same reference signs in all figures; for reasons of clarity or if it appears sensible for other reasons, reference signs mentioned before are dispensed with in subsequent figures. Further advantageous embodiments or developments, especially, combinations of partial aspects of the invention that were initially explained only separately, furthermore emerge from the figures of the drawing and/or from the claims themselves.

DETAILED DESCRIPTION

FIGS. 1, 2, 3*a* and 3*b* schematically show an exemplary embodiment of a (modular) vibronic measuring system which is intended in particular to detect at least one measurement variable of a fluid measuring substance flowing in a (measuring substance) line, namely to determine measured values for one or more measurement variables, for example a mass stream, a volume flow, a density and/or a viscosity, of the measuring substance. For this purpose, the measuring system comprises a base module M1, a vibronic module M2 and, for example, programmable measuring system electronics ME. The measuring system electronics ME can, for example, be formed by means of one or more microprocessors (μC) and/or have a display and operating element, for example formed by means of a touch display, for example for displaying measurement and/or operating data of the measuring system. The base module M1 has a (protective) housing 11 with at least one chamber 11* at least partially wrapped by a housing wall 11+ and at least one first electrical coil 12, for example cylindrical and/or designed as an air coil, which is placed inside the chamber 11* of the (protective) housing and is at least indirectly mechanically connected to the housing wall 11+ and electrically connected to the measuring system electronics ME, and the vibronic module M2 has at least one, for example cylindrical, first permanent magnet 22. The measuring system electronics ME can, as is quite common in measuring systems of the type in question, also be housed at least partially within the chamber 11* and/or at least partially outside the chamber 11*, in particular within an electronics housing 100 of the measuring system, or be designed in a modular manner. The measuring system can, for example, be designed as a modular Coriolis mass stream measuring apparatus and/or correspond to one of the patent applications mentioned at the beginning WO-A 2019/017891, WO-A 2021121867, DE-A 10 2019 134 606, DE 102021105397.8, DE 102020133614.4, DE 102020132685.8, DE 102020133851.1, DE 102020133566.0, DE 102020132986.5, DE 102020132686.6, DE 102020132685.8, DE 102020131452.3, DE 102020132223.2, DE 102020127356.8, DE 102020114519.5 and DE 102020112154.7 correspond to the vibronic measuring systems disclosed.

Figure 1:
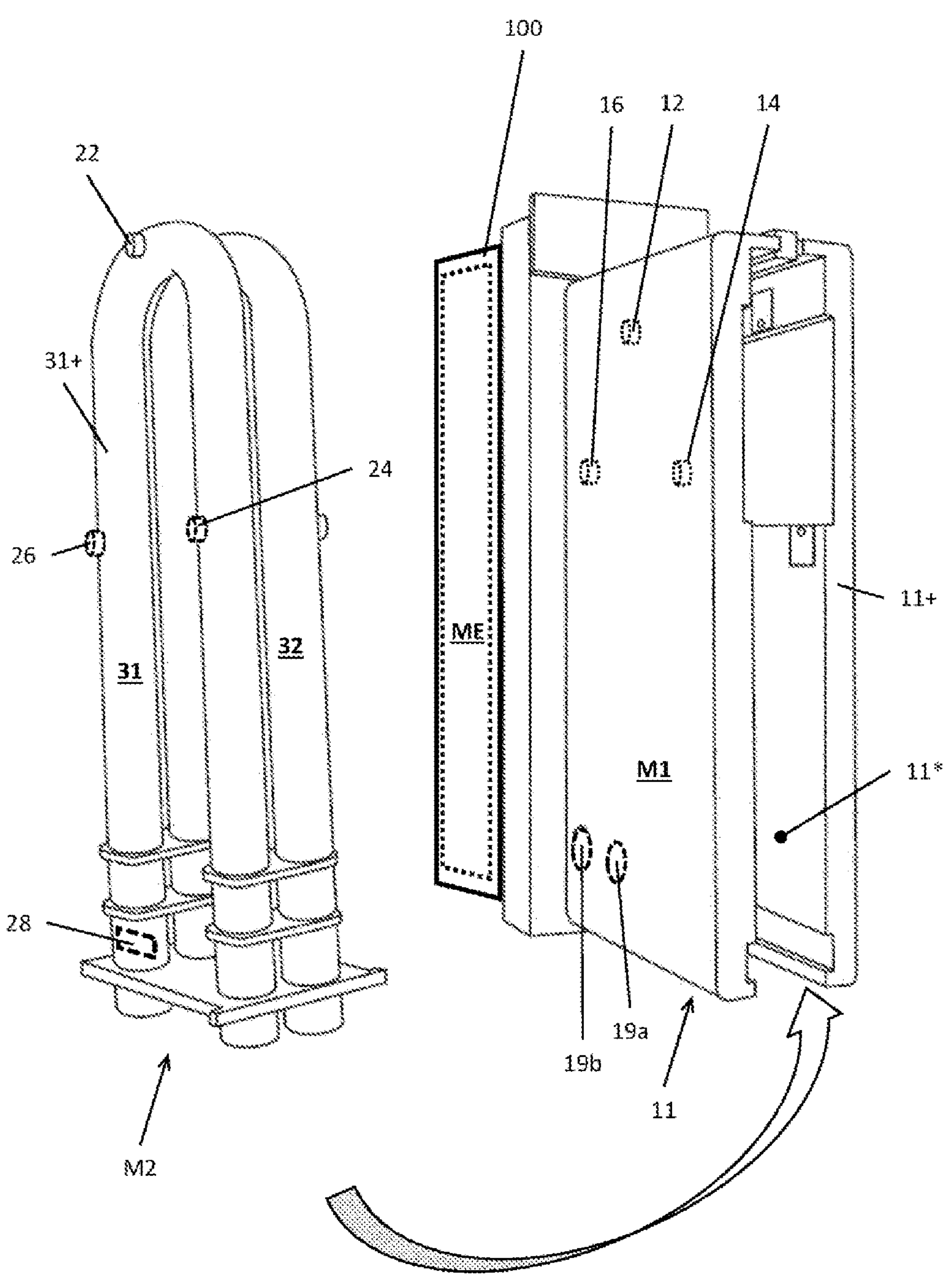
FIG. 1, 2 show an exemplary embodiment of a base module, a measuring system electronics and a vibronic module of a modular vibronic measuring system (still to be assembled)
Figure 2:
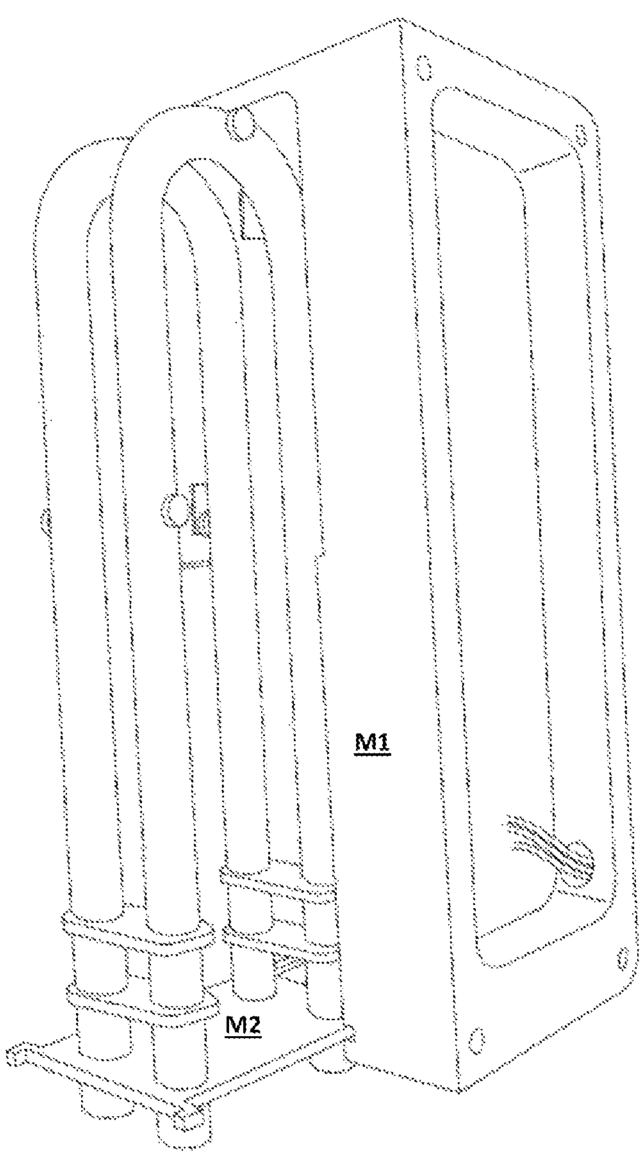
Figures 3A, 3B:
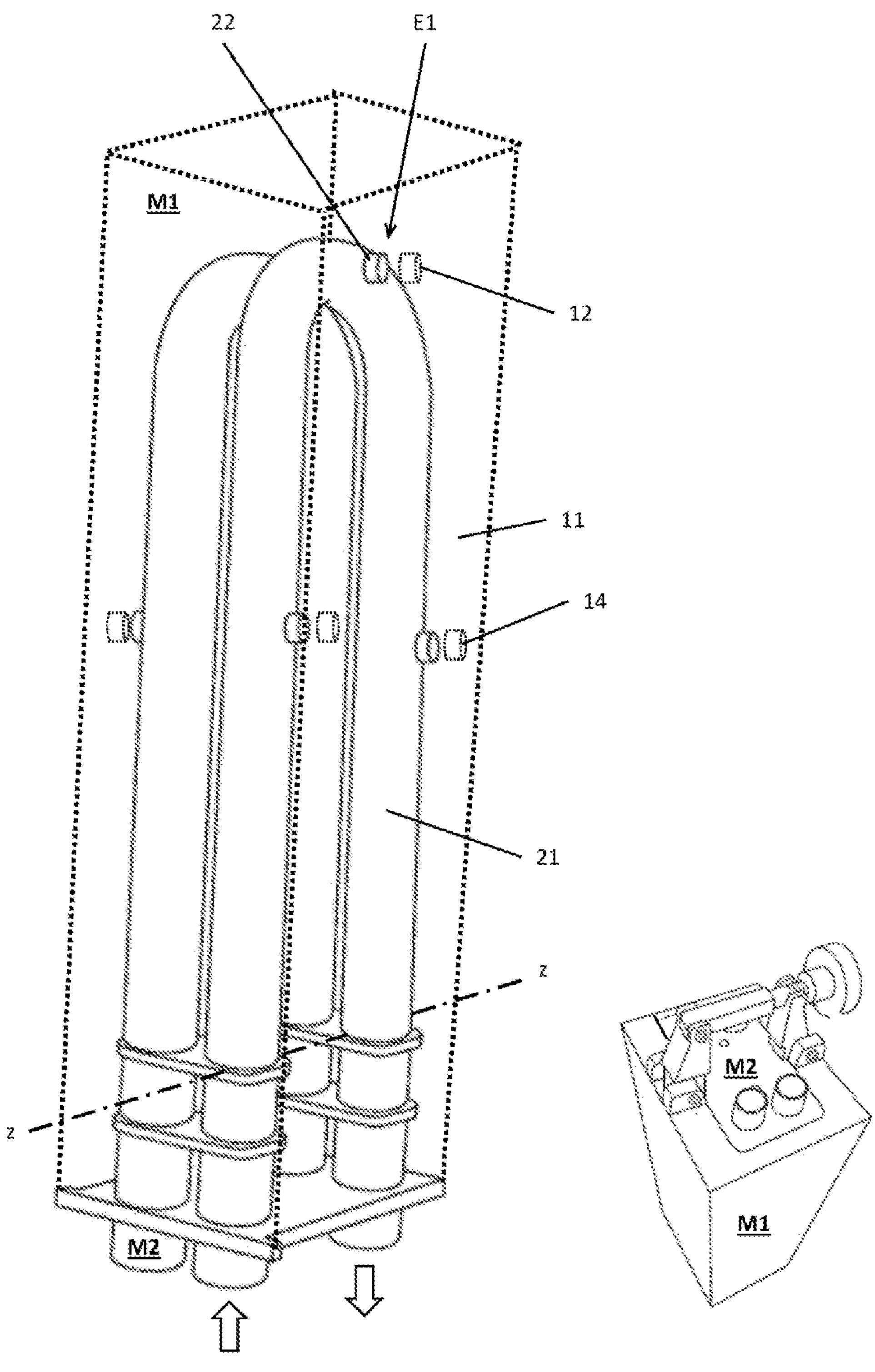
FIG. 3*a*, 3*b* show different side views of an exemplary embodiment of the modular vibronic measuring system in accordance with FIG. 1.

The base module M1 is, as shown schematically in FIGS. 3*a* and 3*b* or as can be seen from a combined view of FIGS. 1, 2, 3*a* and 3*b* without further ado, is configured in particular to receive the vibronic module M2 and to be connected thereto in a mechanically fixed but nevertheless detachable manner, for example in such a manner that the vibronic module M2 is locked in the base module M2, and/or in such a manner that the vibronic module can also be (subsequently) inserted on location, namely in a base module already installed (in a plant). In particular, the base module M1 and the vibronic module M2 are further configured to be assembled or assembled to form a vibration-type measuring sensor (of the measuring system) so that an electro-mechanical vibration exciter and/or an (electro-dynamic) vibration sensor of the measuring system is formed by means of the electric coil 12 (connected to the measuring system electronics ME) and by means of the permanent magnet 22. According to a further embodiment of the invention, the vibronic module is particularly configured to be installed in the base module in such a manner that its permanent magnet 22 is placed within the chamber 11*, but is nevertheless spaced from the housing wall 11+, namely in particular in a static (first) installation position E1 predetermined with respect to an alignment and/or a smallest distance from the electric coil 12, and/or is held in such a manner that an imaginary longitudinal axis of the first permanent magnet and an imaginary longitudinal axis of the electric coil 12 are aligned with one another or extend parallel to one another in extension. In particular, the permanent magnet 22 is further configured to form a voice coil, for example serving as an electrodynamic vibration exciter, and/or a plunger coil, for example serving as an electrodynamic vibration sensor, in installation position E1 together with the electric coil 12. According to a further embodiment of the invention, the vibronic module M2 and the base module M1 are further configured, in particular also on location, to be assembled without tools and/or disassembled again, in particular non-destructively, in such a manner that the vibronic module can be removed again from the base module M1 non-destructively. Alternatively or in addition, the vibronic module M2 is designed in particular to be replaceable or configured to be able to be removed again, in particular non-destructively, in particular also on location from outside the housing and/or through an (insertion) opening of the (protective) housing 11 provided in the housing wall 11+, and/or the vibronic module M2 is configured in particular also on location, to be installed in the base module M1, in particular in such a manner that it can be inserted into the chamber 11* from outside the (protective) housing 11 or through the (insertion) opening and can then be fixed accordingly (releasably again) to the base module. This can be done, for example, without having to handle the base module M1 itself or remove it from the respective (process) plant. The aforementioned (slide-in) opening can also, if necessary, be sealed after installation of the vibronic module by means of an appropriate cover, for example also dust-tight and/or tight against strong water jets and/or explosion-proof. As a result, it is also possible to easily replace a defective or worn (old) vibronic module on location with an intact new vibronic module, which may only be used once or only for a specified period ("disposable"). In order to support correct installation of the vibronic module M2 into the base module M1, the vibronic module M2 and base module M1 can each have corresponding guide structures or elements, for example corresponding (guide) grooves in one of the two modules (M1, M2) and (guide) springs and/or (guide) pins in the other of the two modules that slide therein during assembly. To further simplify the commissioning of the measuring system, the vibronic module M2 can further comprise at least one identification element 28, for example a bar code, QR code or RFID label (RFID TAG), which relates to or carries identifying information about the vibronic module M2, and/or the base module M1 can have at least one light-emitting semiconductor element 19*a*, for example a light-emitting diode (LED), positioned inside the (protective) housing and connected to the measuring system electronics (into the chamber 11*) for reading the identifying element 28, and/or one or more radio transmitters/receivers (RF transceivers), each positioned within the (protective) housing and connected to the measuring system electronics, and/or photosensors 19*b* (sensitive to light illuminating the chamber 11*), for example namely one or more CCD photosensors and/or one or more CMOS photosensors.

According to a further embodiment of the invention, the vibronic module M2 has at least one second permanent magnet 24 positioned at a distance from the permanent magnet 22, in particular cylindrical and/or identical in construction to the permanent magnet 22. Further, the base module M1 accordingly has at least one second electrical coil 14 placed within the chamber 11* of the (protective) housing, for example cylindrical and/or designed as an air coil and/or identical in construction to the first electrical coil 12, which (remote from the electrical coil 12) is at least indirectly mechanically connected to the housing wall 11+ and is also electrically connected to the measuring system electronics, and the base module is furthermore configured to receive the vibronic module in such a manner that the permanent magnet 24 is held in a second installation position, in particular with respect to an alignment and/or remote from the first installation position, or that an imaginary longitudinal axis of the permanent magnet 24 and an imaginary longitudinal axis of the electric coil 14 are aligned with one another or are parallel to one another in extension. In addition, the vibronic module M2 can also have more than two permanent magnets (22, 24) arranged at a distance from one another, thus at least one third permanent magnet 26, and the base module M1 can have more than two electrical coils (12, 14) arranged at a distance from one another within the chamber 11*, thus at least one third air coil 16.

According to a further embodiment of the invention, the vibronic module M2 has at least one (first) tube 31 with a tube wall forming an outer shell surface of the tube 31, for example made of a metal or a plastic, and with a lumen 21* wrapped by the same tube wall, and the permanent magnet 22 is fixed to the outside of the tube wall, for example connected to it by a material bond. As shown schematically in FIG. 1, the at least one tube 31 can be straight at least in sections and/or curved at least in sections, for example in such a manner that a central segment of the tube wall extending between a first segment end and a second segment end of the tube wall remote therefrom is designed to be U-shaped or V-shaped and/or that, as also shown schematically in FIG. 1, the at least one permanent magnet 22 is attached to the outside of the aforementioned central segment. The aforementioned permanent magnet 24 and/or other permanent magnets (26) of the vibronic module M2 can also be attached to the outside of the central segment, for example. Further, the at least one tube 31 is also intended, inter alia, to be incorporated into the base module M1 in the manner described above and also to be incorporated into the course of a (measuring substance) line, for example a hose line or a plumbing line. In addition, the at least one tube 31 is configured in particular to carry in its lumen a fluid measuring substance flowing, in particular at least temporarily, in a predeterminable direction of flow, for example from the aforementioned first segment end to the aforementioned second segment end, for example via the aforementioned (measuring substance) line, and to be vibrated in the process; in particular also in such a manner that the at least one tube 31 performs forced bending or resonance oscillations about a static rest position and/or that the at least one permanent magnet 22 is moved relative to the electric coil 12. Such mechanical vibrations of the at least one (measuring) tube 31 or its central segment can, for example, be excited or maintained by means of the above-mentioned vibration exciter formed by means of the permanent magnet 22 and the coil 12 and/or detected by means of the above-mentioned vibration sensor formed (by means of the permanent magnet 22 and the coil 12), in particular in such a manner that at least one vibration signal representing the same vibrations of the tube 31 or its central segment is provided by the vibration sensor. Not least in order to enable such vibrations of the at least one (measuring) tube 31, in particular of the aforementioned central segment, the vibronic module M2 according to a further embodiment of the invention is further configured to be installed in base module M1 or its (protective) housing 11 in such a way that, as also shown schematically in FIG. 3*a*, the at least (measuring) tube 31 is placed at least partially, for example also completely, within the chamber 11*, nevertheless at least its aforementioned central segment is spaced apart from the housing wall 11+.

As is quite usual with such vibronic modules or vibronic measuring systems formed therewith, the vibronic module M2 can furthermore have at least one second (measuring) tube 32, for example also identical in construction and/or function to the first tube, with a tube wall forming an outer shell surface of the second tube, in particular made of a metal or a plastic, and with a lumen wrapped by the same tube wall. In this case, the aforementioned second permanent magnet 24 can, for example, namely vis-a-vis the permanent magnet 22 fixed to the first tube 31, also be fixed to the second tube, in particular, namely connected thereto by a material connection; this, for example, also in such a manner that an imaginary longitudinal axis of the permanent magnet 24 and an imaginary longitudinal axis of the permanent magnet 22 are aligned with one another or extend parallel to one another as an extension. The first and second (measuring) tubes 31, 32 can also be fluidically connected to one another by means of a first flow divider on the inlet side and a second flow divider on the outlet side, as is quite common in vibronic measuring systems of the type in question, and may also be integrated into the course of the aforementioned (measuring material) line during operation of the measuring system. Not least for the case described above in which the vibronic module M2 is formed by means of two tubes (31, 32), the vibronic module M2 can also have more than three permanent magnets arranged at a distance from one another, for example at least six permanent magnets in total, and the base module M1 can accordingly have more than three electrical coils arranged at a distance from one another within the chamber 11*, for example at least six electrical coils in total, for example also each designed as air coils.

In order to excite and maintain mechanical vibrations of the at least one (measuring) tube 31 or of the vibronic module M2 formed therewith, the measuring system electronics ME is, according to a further embodiment, also configured to provide a first electrical (measuring system) driver signal and to introduce it into at least one of the electrical coils (12, 14) of the base module M2, for example namely the coil 12 and/or the aforementioned coil 14, in order to feed electrical power required for the aforementioned mechanical vibrations into the at least one electrical coil; in particular in such a manner that the at least one (measuring system) driver signal has an impressed alternating current and/or at least one signal frequency corresponding to a mechanical resonance frequency of the vibronic module M2, in particular its at least one (measuring) tube 31. In the aforementioned case that the base module M1 also comprises at least the electrical coil 14 in addition to the electrical coil 12, the measuring system electronics ME can further be configured to feed electrical power into the second electrical coil 14 by means of a second electrical (measuring system) driver signal, in particular with an impressed alternating current and/or with a signal frequency corresponding to a mechanical resonance frequency of the vibronic module or its at least one (measuring) blade and/or simultaneously with the first driver signal.

According to another embodiment of the invention, the measuring system electronics ME is also configured, for example, to detect and evaluate a first electrical (alternating) voltage induced, for example, in the electrical coil 12 and/or in the aforementioned coil 14 by the electrical coil 12 (14), for example, using the (alternating) voltage to determine (parameter) measured values for at least one parameter of the (alternating) voltage, such as approximately an amplitude, a frequency and/or a phase angle, and/or to calculate measured values for the measurement variable to be detected at least by the measurement substance based on the (alternating) voltage or (parameter) measured values determined therefor. Furthermore, the measuring system electronics ME can also be configured to calculate measured values for an inductance of the electric coil based on the (AC) voltage or (parameter) measured values determined for this purpose, for example in order to take these into account accordingly when checking a functional capability of the measuring system or in order to compare the determined inductance of the first electric coil 12 with a previously determined (inductance) reference value and/or one or more threshold values predetermined for this purpose. Alternatively or additionally, the measuring system electronics ME can, for example, also be configured to compare one or more of the aforementioned (parameter) measured values with one or more (parameter) reference values determined in advance for this purpose and/or one or more threshold values predetermined for this purpose in order to check the functionality of the measuring system. In the aforementioned case that the base module M1 also comprises at least the electrical coil 14 in addition to the electrical coil 12, the measuring system electronics can also be configured to detect and evaluate a second electrical (alternating) voltage induced in the coil 14 by the second electrical coil, for example, to calculate (parameter) measured values for the at least one parameter of the second (alternating) voltage and/or a phase difference established between the first and second (alternating) voltages on the basis of the second (alternating) voltage, for example in order to calculate measured values for the at least one measurement variable to be detected by the measurement material. According to a further embodiment of the invention, the measuring system electronics is in particular also configured to use a phase difference established between the first and second (alternating) voltages to obtain measured values for at least one measurement variable, in particular a mass stream, of a flowing fluid and/or the measuring system electronics are configured to determine and evaluate (parameter) measured values for the aforementioned phase difference, for example to compare one or more (parameter) measured values for the phase difference with a previously determined (parameter) reference value and/or one or more threshold values predetermined for this purpose. Alternatively or in addition, the measuring system electronics may further be configured to determine measured values also for an inductance of the second electrical coil.

Figure 4:
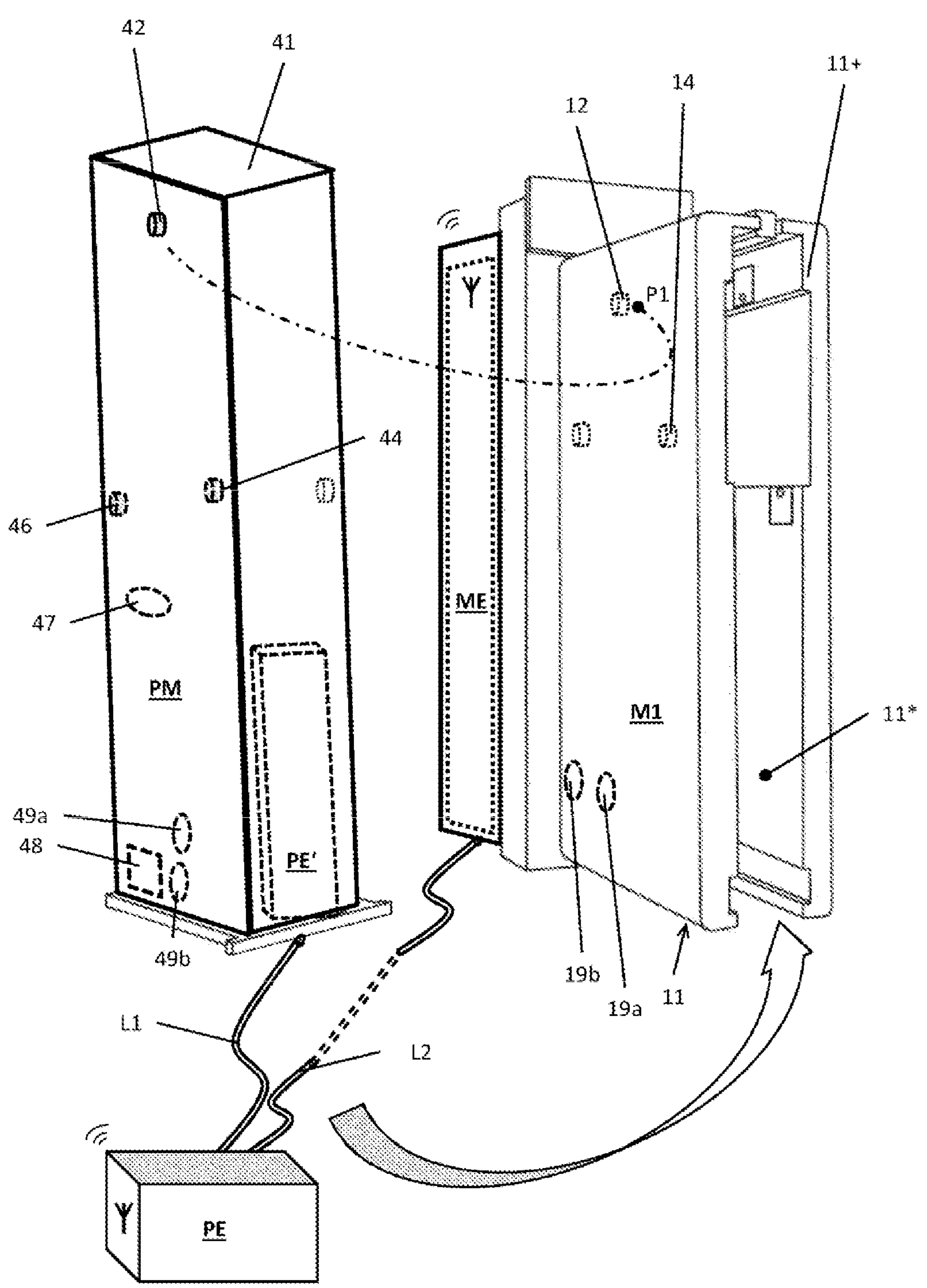
FIG. 4 shows an exemplary embodiment of a test module (serving to form a test system or a test arrangement) or a test system formed therewith for a modular vibronic measuring system in accordance with FIG. 1.

In order to be able to check or verify the functionality of the base module M1 itself and/or of the measuring system electronics ME electrically connected thereto or of the subsystem thus formed very easily, if necessary also on location during commissioning and/or recurrently, a corresponding test module PM is proposed or provided in accordance with the invention, which—as also schematically represented in FIG. 4—has a carrier element 41, for example monolithic and/or plate-shaped, and at least one first test element 42, in particular electrical and/or magnetic and/or electronic and/or arranged on a printed circuit board of the test module PM, mechanically connected to the carrier element 41 for generating and/or detecting a magnetic field, for example namely an electrical coil and/or a permanent magnet. The carrier element 41 can, for example, consist of or be produced from metal and/or a plastic, for example also at least partially embedding the at least one test element 41 or the aforementioned printed circuit board, for example also in such a manner that an outer protective layer of the carrier element 41 is formed by means of the aforementioned plastic. The aforementioned plastic can, for example, be a chemically resistant and/or high-strength plastic, such as a polycarbonate (PC) or a polyether ether ketone (PEEK).

According to a further embodiment of the invention, the first test element 42 is configured to generate a (test) magnetic field with time-varying magnetic field strength or time-varying magnetic flux density by means of an injected time-varying electrical drive signal, for example with an impressed alternating voltage or an impressed alternating current and/or the first test element 42 is configured to generate a time-varying first electrical test signal, for example with an alternating voltage dependent on the magnetic field and/or an alternating current dependent on the magnetic field, by means of a magnetic field interacting with the first test element with time-varying magnetic field strength and/or time-varying magnetic flux density. Accordingly, the first test element 42 may have, for example, an electrical coil designed as a cylindrical and/or air coil and/or a permanent magnet. Alternatively or additionally, the first test element 42 may also be formed, for example, by means of a CMOS Hall sensor or by means of another Hall sensor.

Figure 5:
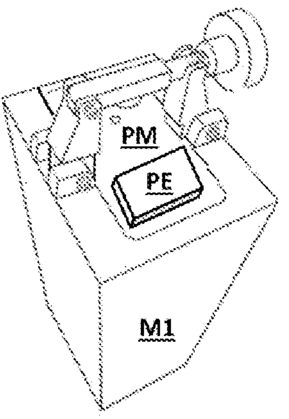
FIG. 5 shows an exemplary embodiment of a test arrangement formed by means of a test module or test system in accordance with FIG. 4.

The test module PM according to the invention is, as also shown schematically in FIG. 5 or is readily apparent from a combined view of FIGS. 4 and 5, is further particularly intended or designed to be used to form a test arrangement (PM+M1; PM+M1+ME), namely to be inserted (instead of the vibronic module M2) into the base module M1 and to be detachably mechanically connected thereto again, in such a manner that the carrier element 41 and the first test element 42 are placed inside the chamber 11+; this in particular in the same manner as the vibronic module M2 or in such a manner that the test module PM is locked in the base module M1 or is not movable. In particular, the test module PM is furthermore configured to be installed in the base module M1 in such a way that the first test element 42 is held in a first test position P1 predetermined by the first electrical coil 12 of the base module or corresponding to the aforementioned first installation position, for example also in such a manner that the first test element 42 held in the first test position P1 has a predetermined alignment and/or a predetermined smallest distance from the first electrical coil 12 and/or that an imaginary longitudinal axis of the first test element and an imaginary longitudinal axis of the first electrical coil 12 are aligned with one another or extend parallel to one another in extension. In the above-mentioned case that the test element 42 has an electric coil, the test element 42 together with the electric coil 12 of the base module M1 can, for example, form a transformer and in the other case mentioned that the test element 42 has a permanent magnet, the test element 42 together with the electric coil 12 of the base module M1 can, for example, also form a magnetic coil. In order to support the correct installation of the test module PM into the base module M1, the test module PM can also have the aforementioned guide structures or elements of the vibronic module M2 corresponding to or corresponding with the aforementioned guide structures or elements of the base module M1.

Not least for the aforementioned case that the base module M1 has several electrical coils, for example at least the coil 14, the test module PM can furthermore have in a corresponding manner at least one test element 44 mechanically connected to the carrier element 41, for example structurally and/or functionally identical to the first test element 42 and/or spaced apart from the first test element, second test element for generating and/or detecting a magnetic field, possibly also additionally having at least one third test element 46 for generating and/or detecting a magnetic field, which is mechanically connected to the carrier element 41 and in particular is structurally and/or functionally identical to the first and/or second test element and/or is spaced apart from the first and second test elements. Further, the test module PM may be configured to be inserted into the first base module M! and to be mechanically reconnected thereto in such a manner that each of the aforementioned test elements is placed within the chamber 11+, for example, in such a manner that the second test element 44 is held at a second test position which is predetermined with respect to an orientation and/or a smallest distance from the second electrical coil 14 and/or is spaced from the first test position P1 and/or corresponds to the aforementioned second installation position, and/or that an imaginary longitudinal axis of the second test element 44 and an imaginary longitudinal axis of the second electrical coil 14 are aligned with one another or extend parallel to one another as an extension.

According to a further embodiment of the invention, the test module PM according to the invention, for example namely its first test element 42 and possibly to the aforementioned second test element 44 or for example also to further test elements (46) of the test module PM, is further electrically connected to a test system electronics PE (PE+PE'), for example formed and/or programmable by means of one or more microprocessors (μC), to form a test system which serves to test the base module M1 and/or the measuring system electronics ME electrically connected to the base module M1. The test system electronics PE (of the test system) can, as also shown schematically in FIG. 4, for example be of modular design (PE+PE') or can be disconnected again and/or designed to be portable and/or connected via connecting cable L1 to the test module PM, in particular to one or more of its test elements (42, 44, 46). Alternatively or additionally, the test system electronics PE can also be fastened directly, for example rigidly, to the test module PM or to its carrier element 41 and/or arranged at least as part of the carrier element 41, possibly also embedded at least partially (PE') in its aforementioned plastic. In addition, the test system electronics PE can also be configured to be electrically connected to the measuring system electronics ME, for example via cable connection L2 and/or to obtain the electrical power required for operation from the measuring system electronics ME and/or to be able to exchange or exchange measurement or control data required for operation of the test arrangement with the measuring system electronics ME. Alternatively or as a supplement, the test system electronics PE can also have an (rechargeable) energy store and/or a radio unit, for example for transmitting (test system) data and/or for receiving (measuring system) data, which at least part of the electric energy required to operate the test system. For storing digital measurement and/or operating data, for example also one or more digitized certificates of the test and/or measurement system and/or one or more digitized test results obtained by means of the test arrangement thus formed and/or one or more digital nominal or reference values for mechanical, electrical and/or electromechanical parameters of vibronic modules which can be inserted into the base module M1 in each case, the test system electronics may further have at least one non-volatile memory (EEPROM). For displaying (test system) data, possibly also (measuring system) data and/or for operating the test system or the test arrangement formed therewith, the test system electronics ME or the test arrangement formed therewith may further also have a display and operating element (HMI) formed, for example, by means of a touch display.

According to a further embodiment of the invention, the test system electronics PE is furthermore also configured, for example also in conjunction with the measuring system electronics ME, to generate a (first) electrical (test system) driver signal, for example with an impressed alternating current or with an impressed alternating voltage and/or with a predetermined and/or predeterminably variable signal frequency and/or with a predetermined and/or predeterminably variable phase angle, for example also in such a manner that the at least one signal frequency of the (test system) driver signal corresponds to a mechanical resonance frequency of the base module M1, and to feed electrical power into the first test element 42 by means of the (first) electrical (test system) driver signal, for example to generate a (test) magnetic field. Alternatively or additionally, the test system electronics PE may further be configured, for example in conjunction with the measuring system electronics ME, to provide the (first) electrical (test system) driver signal with a signal frequency corresponding to a (nominal) mechanical resonance frequency of the vibronic module M2. Furthermore, the test system electronics PE can be further configured to drive the test system by means of a (second) electrical (test system) driver signal, for example with an impressed alternating current or with an impressed alternating voltage and/or with a predetermined and/or predeterminably variable signal frequency and/or with a signal frequency corresponding to a mechanical resonance frequency of the base module M1 and/or with a predetermined and/or predeterminably variable phase angle, to feed electrical power into the second test element 44, for example also simultaneously with the aforementioned first (test system) driver signal and/or in such a manner that the first and second (test system) driver signals have the same signal frequency. According to a further embodiment, the test system electronics PE is further in particular also configured to generate the first and second (test system) driver signals in such a manner that between said first and second test system driver signals a predetermined and/or predeterminably variable (test) phase difference, namely a difference between a phase angle of the first (test system) driver signal and a phase angle of the second (test system) driver signal, is set at least temporarily. In addition, the test system electronics can be configured to transmit the (test) phase difference in the form of digital (test system) data to the measuring system electronics ME, and/or the measuring system electronics ME can be configured to determine and evaluate (parameter) measured values for the aforementioned test system phase difference, for example to compare one or more (parameter) measured values for the (test system) phase difference with a previously determined (parameter) reference value and/or one or more threshold values predetermined for this purpose. According to a further embodiment of the invention, the test system electronics PE is further configured, for example also in combination with the measuring system electronics ME, to provide the (first) electrical (test system) driver signal with an amplitude and/or frequency characteristic which simulates a disturbance of the measuring system. Such disturbances of the measuring system (to be simulated by means of the test system electronics PE or by means of the test system) can be, for example, a disturbance, possibly also irreversible, of the base module M1 and/or a vibronic module (M2) used therein, for example as a result of wear, and/or a (temporary) disturbance of a measured substance to be detected by means of the measuring system, for example due to foreign substances carried therein. Alternatively or in addition, the measuring system electronics ME can also be configured to calculate (simulation) measured values for at least one simulation variable simulating a fault of the vibronic module by means of a (first) electrical (test system) driver signal generated in the first electrical coil, for example, with (simulation) reference values corresponding to the (first) electrical (test system) driver signal and/or one or more threshold values specified for this purpose, and/or the measuring system electronics ME can be configured to calculate (simulation) measured values for at least one simulation variable simulating a measurement variable, in particular a mass stream and/or a density and/or a viscosity, and/or a disturbance of a flowing fluid, in particular to compare them with (simulation) reference values corresponding to the (first) electrical (test system) driver signal and/or one or more threshold values predetermined for this purpose. In addition to disturbances of the measurement system caused by wear of individual components or modules and/or disturbances of the measurement material, various environmental measurement variables, such as multi-frequency and/or high-frequency electromagnetic (interference) radiation (EMC) propagating within the base module M1, sound waves propagating within the base module M1, in particular airborne and/or structure-borne sound waves, thermal radiation propagating within the base module M1, too high or too low a temperature within the base module M1 or too high a humidity within the base module M1, can also impair the functionality or measuring accuracy of the measuring system. For detecting at least one physical environmental measurement variable within the base module M1 and for converting the same (detected) environmental measurement variable into an environmental measurement signal, the test module PM according to a further embodiment therefore further has at least one environmental sensor 47, for example a sound receiver (microphone), a temperature sensor, a (micro) bolometer, a thermopile, a humidity sensor, a radiation detector or an antenna, mechanically connected to the carrier element 41 and possibly also spaced apart from the first test element 42 and the test system electronics PE is also configured to receive and evaluate the environmental measurement signal, for example to determine measurement values for the at least one environmental measurement variable and, if necessary, to compare them with predetermined threshold values.

According to a further embodiment of the invention, the test system electronics PE is further configured to detect an electrical (alternating) voltage inductively coupled into the first test element 42 by means of the first electrical coil 12 or induced in the first test element 42 by the first test element 42 and to evaluate it in such a manner that the test system electronics PE, using the first (alternating) voltage, can determine (parameter) measured values for at least one parameter of the said (alternating) voltage, in particular an amplitude (voltage level), a frequency and/or a phase angle and/or an inductance of the first electric coil and/or at least one (parameter) measured value for at least one (signal) parameter, in particular a voltage level, a current strength or a frequency, of an electrical (measuring system) driver signal fed into the first electrical coil 12 by means of the measuring system electronics ME. In addition, the test system electronics PE can also be configured to compare one or more of the aforementioned (parameter) measured values and/or the determined inductance of the first electric coil 12 with a respective reference value determined in advance and/or one or more threshold values predetermined for this purpose in each case. Not least for the aforementioned case in which the measuring system electronics ME is configured to feed the first (measuring system) driver signal into the first electrical coil 12 or the test element 42 is configured to generate the first electrical test signal, the test system electronics PE can furthermore in particular also be configured to tap and evaluate the first electrical test signal generated during operation of the test arrangement by means of the first (measuring system) driver signal from the first test element 42, for example to determine an (alternating) voltage and/or an (alternating) current of the (measuring system) driver signal and/or to determine an inductance of the first electrical coil 12 using the first test signal. For the other case mentioned, in which the measuring system electronics ME is configured to feed the second (measuring system) driver signal into the second electrical coil 24, the test system electronics PE can furthermore also be configured accordingly, tapping and evaluating the second electrical test signal generated during operation of the test arrangement by means of the second (measuring system) driver signal from the second test element 44, for example using the second test signal to determine an (alternating) voltage and/or an (alternating) current of the second (measuring system) driver signal and/or to determine an inductance of the second electrical coil 24. Furthermore, the test system electronics PE can be further configured to compare the (alternating) voltages or (alternating) currents determined for the respective (measuring system) driver signal and/or the inductances determined for the respective coil of the base module with an associated reference value, for example stored in the aforementioned non-volatile storage (EEPROM).

In order to enable a prompt and simple adjustment of setting parameters and/or control commands controlling the test arrangement or a test method carried out with it and/or of measurement data collected by means of the test arrangement, in particular also immediately before and/or during an ongoing test method, the measuring system electronics and the test system electronics are, according to a further embodiment of the invention, configured to communicate with one another via a data line and/or by radio, for example also in order to be able to execute or execute a test program (pre) configured for the test arrangement automatically and/or in dialog with a user of the test arrangement. Alternatively or additionally, the measuring system electronics and/or the test system electronics can also be designed to be integrated into a superordinate electronic data processing system formed, for example, by means of a programmable logic controller (PLC), a process control system (PCS), an edge (computing) device and/or a cloud (computing) system, which may also be mobile. Accordingly, according to a further embodiment, the measuring system electronics has at least one data output for outputting (measuring system) data, in particular digital data and/or data linked to a time stamp, for example, namely measuring and/or operating data characterizing the measuring system electronics and/or measuring and/or operating data characterizing the base module and/or measuring system electronics internally determined setting parameters for the test system electronics and/or measuring system electronics internally generated control commands for the test system electronics. In addition, the test system electronics have at least one data input for receiving such (measuring system) data. In addition, in a test arrangement formed in this manner, the data input of the test system electronics PE can be connected to the data output of the measuring system electronics ME. In addition, the measuring system electronics ME can be configured to transmit such (measuring system) data to the test system electronics PE via data output and/or the test system electronics PE can be configured to receive and evaluate (measuring system) data from the measuring system electronics ME. Alternatively or in addition, the test system electronics PE can, for example, also have at least one data output for outputting (test system) data, in particular digital data and/or data linked to a time stamp, in particular measuring and/or operating data determined internally by the test system electronics PE and/or setting parameters and/or control commands generated internally by the test system electronics PE for the measuring system electronics ME, for example also a start command starting the test arrangement or starting the test and/or a stop command ending the test, and accordingly the measuring system electronics ME have at least one data input for receiving (test system) data, in particular digital data and/or data linked with a time stamp, for example namely measuring and/or operating data determined internally by the test system electronics PE and/or setting parameters and/or control commands for the measuring system electronics generated internally by the test system electronics PE. In addition, in such a manner, the data input of the measuring system electronics can be connected to the data output of the test system electronics. In the aforementioned case that the test system electronics have a radio unit, the measuring system electronics can further be configured to transmit (measuring system) data by radio and/or to receive (test system) data by radio, or the measuring system electronics can be equipped with a radio unit compatible with the radio unit of the test system electronics.

Not least for the case described above, in which the base module M1 together with the measuring system electronics ME are configured to be able to read out an identification element (28) of the vibronic module M2, the test module can further comprise at least one identification element 48, in particular carrying information relating to or identifying the test module, which is mechanically connected to the carrier element in order to simplify the commissioning of the test arrangement thus formed, for example a bar code label, a QR code label or a radio label (RFID TAG) and, in addition, the measuring system electronics ME can also be configured to read out information carried by the identification element 48 of the test module PM from the identification element 48, in particular to evaluate it, approximately in order to verify whether the test module PM is compatible with the base module M1 and/or the measuring system electronics ME or is authorized to form the test arrangement. Alternatively or in addition, the test module PM can be used to transmit (test system) data to the measuring system electronics ME—not least also for the aforementioned case in which at least one photosensor 19*b* connected to the measuring system electronics ME is provided in the base module M1—further having at least one light-emitting semiconductor element 49*a*, for example a light-emitting diode (LED), which is mechanically connected to the carrier element 41 and electrically connected to the test system electronics PE and/or the test module PM can be used to receive (measuring system) data from the measuring system electronics ME—not least also for the aforementioned case, that at least one light-emitting semiconductor element 19*a* connected to the measuring system electronics ME is provided in the base module M1—have one or more photosensors 49*b*, for example one or more CCD photosensors and/or one or more CMOS photosensors, mechanically connected to the carrier element 41 and electrically connected to the test system electronics.

The test module PM according to the invention or the test system according to the invention formed with it can be used, for example, for commissioning and/or also for (over) testing the vibronic measuring system, if necessary also recurrently, in particular also on location or in the course of replacing a worn or defective vibronic module with an intact new vibronic module, in such a manner that the respective test arrangement is first formed by means of the test module or the test system. For this purpose, the test module PM is inserted into the base module M1 (not fitted with a vibronic module) (FIG. 5), for example also after a vibronic module M2 initially inserted in the base module M1 has been removed from the base module M2, and fixed or locked in the base module M1 accordingly, for example also by means of a locking mechanism that otherwise serves to lock the vibronic module. In addition, the test system electronics PE and the measuring system electronics ME, as also shown schematically in FIG. 4, can be electrically connected to one another and/or coupled to one another (in terms of signals) and/or integrated (in terms of data) into the superordinate electronic data processing system described above in order to form the test arrangement. Subsequently, the base module M1 and/or the measuring system electronics ME can be checked by means of the test module PM or the test system, for example by comparing at least one (parameter) measured value determined by means of the test system electronics and/or at least one (parameter) measured value determined by means of the measuring system electronics with a respectively associated reference value and/or at least one threshold value predetermined for this purpose. After completion of the check, the test module PM can be removed from the base module M1 and, if necessary, the test system electronics PE can be disconnected from the measuring system electronics ME. Last but not least, in the event that the functionality of the base module M1 and the measuring system electronics ME has been confirmed ("pass") by testing, a vibronic module M2 can then be inserted into the base module M1 to form a vibration-type sensor or a vibronic measuring system. Otherwise ("fail"), the defective base module can be replaced very quickly with an intact (new) base module or the defective measuring system electronics can be replaced with intact (new) measuring system electronics.

The invention claimed is:

1. A test arrangement, comprising:

a test system for testing a base module of a vibronic measuring system and/or a measuring system electronics of the vibronic measuring system electrically connected to the base module, the test system including:

a test module for the base module of the vibronic measuring system, the test module including:

a carrier element; and a first test element mechanically connected to the carrier element for generating and/or detecting a magnetic field, wherein the test module is configured to be inserted into the base module and to be detachably mechanically connected thereto again; and a test system electronics that is electrically connected to the test module; and the base module of the vibronic measuring system, wherein the base module has a protective housing with a chamber at least partially wrapped by a housing wall and a first electrical coil that is placed inside the chamber of the protective housing and which is at least indirectly mechanically connected to the housing wall and electrically connected to the measuring system electronics, and wherein the test module of the test system is inserted into the base module and is mechanically fixedly connected thereto, but nevertheless releasably connected again, in such a manner that the carrier element and the first test element are placed within the chamber.

2. The test arrangement according to claim 1, further comprising:

the measuring system electronics of the vibronic measuring system electrically connected to the base module.

3. The test arrangement according to claim 2, wherein the measuring system electronics are configured to detect and evaluate a first electrical alternating voltage from the first electrical coil that is inductively coupled into the first electrical coil and/or induced in the first electrical coil to determine parameter measured values for at least one parameter of the first alternating voltage and/or measured values for at least one measurement variable of a flowing fluid measuring substance and/or an inductance of the first electric coil.

4. The test arrangement according to claim 3, wherein the measuring system electronics is configured to determine the inductance of the first electric coil on the basis of the alternating voltage, and wherein the measuring system electronics is configured to determine the parameter measured values for the at least one parameter of the first alternating voltage using the first alternating voltage.

5. The test arrangement according to claim 4, wherein the base module has a second electrical coil that is placed within the chamber of the protective housing and which is at least indirectly mechanically connected to the housing wall, and wherein the second electrical coil is electrically connected to the measuring system electronics.

6. The test arrangement according to claim 5, wherein the measuring system electronics is configured to feed electrical power into the second electrical coil via an electrical measuring system driver signal.

7. The test arrangement according to claim 6, wherein the measuring system electronics is configured to detect and evaluate a second electrical alternating voltage from the second electrical coil and/or to determine measured values for at least one measurement variable of a flowing fluid and/or an inductance of the second electric coil.

8. The test arrangement according to claim 7, wherein the measuring system electronics are configured to determine and evaluate parameter measured values for a phase difference established between the first and second alternating voltages, and wherein the measuring system electronics are configured to determine measured values for at least one measurement variable of a flowing fluid on the basis of a phase difference established between the first and second alternating voltages.

9. The test arrangement according to claim 8, wherein the test system electronics is configured to detect and evaluate an electrical alternating voltage from the first test element which is inductively coupled into the first test element or which is induced in the first test element.

10. The test arrangement according to claim 9, wherein the test system electronics is configured to determine at least one parameter measured value for at least one signal parameter via an electrical alternating voltage applied to the first test element of an electrical measuring system driver signal fed into the first electrical coil via the measuring system electronics; and/or wherein the test system electronics is configured to determine an inductance of the first electric coil on the basis of the alternating voltage.

11. The test arrangement according to claim 10, wherein the measuring system electronics is configured to feed electrical power into the first electrical coil via the first electrical measuring system driver signal.

12. The test arrangement according to claim 5, wherein the base module is configured to receive a vibronic module of the measuring system and to be connected thereto in a mechanically fixed, yet detachable manner, and/or wherein the test module is configured to be installed in the base module.

13. The test arrangement according to claim 12, wherein the measuring system electronics is configured to provide the first electrical measuring system driver signal with a signal frequency corresponding to a mechanical resonance frequency of the vibronic module.

14. The test arrangement according to claim 13, wherein the vibronic module has a first permanent magnet.

15. The test arrangement according to claim 14, wherein the vibronic module is configured to be installed in the base module in such a manner that its first permanent magnet is placed inside the chamber, but is nevertheless spaced apart from the housing wall and/or in such a manner that an imaginary longitudinal axis of the first permanent magnet and an imaginary longitudinal axis of the first electric coil are aligned with one another or extend parallel to one another as an extension.

16. The test arrangement according to claim 14, wherein the vibronic module is designed to be exchangeable, in such a manner that it can be brought into the chamber from outside the protective housing of the base module and/or through an insertion opening of the protective housing provided in the housing wall and that it can be removed again from the base module.

17. The test arrangement according to claim 16, wherein the vibronic module of the measuring system comprises a first tube having a tube wall forming an outer shell surface of the tube and having a lumen wrapped by the same tube wall, and wherein the vibronic module is configured to be installed in the protective housing in such a manner that the first tube is placed at least partially within the chamber, but is nevertheless spaced apart from the housing wall.

18. The test arrangement according to claim 17, wherein the first permanent magnet is fixed on the outside of the tube wall; and/or wherein the first permanent magnet is configured to form, in the installed position, together with the first electrical coil, a voice coil; and wherein the first tube is designed to be U-shaped or V-shaped at least in portions; and/or wherein the first tube is configured to have a fluid measuring substance flowing through it and to be vibrated in the meantime, in such a manner that the first alternating voltage represents vibrational movements of the first tube; and/or wherein the tube is configured for guiding a fluid measuring substance flowing in its lumen; and wherein the tube is configured to be vibrated; and/or wherein the measuring system electronics are configured to use the first alternating voltage to determine measured values for at least one measurement variable of a fluid measuring substance flowing through the first tube.

19. The test arrangement according to claim 18, wherein the first permanent magnet is fixed to a central segment of the tube wall extending between a first segment end and a second segment end remote therefrom.

20. The test arrangement according to claim 19, wherein the vibronic module further has a second tube which is structurally identical and/or functionally identical to the first tube, wherein the second tube has a second tube wall forming an outer shell surface of the second tube and has a lumen wrapped by the same tube wall.

21. The test arrangement according to claim 20, wherein the vibronic module has a second permanent magnet, and wherein the base module is configured to receive the vibronic module in such a manner that the second permanent magnet is held in a second installation position.

22. The test arrangement according to claim 21, wherein the second installation position is predetermined with respect to a smallest distance to the second electrical coil and/or corresponds to the second test position.

23. The test arrangement according to claim 21, wherein the second permanent magnet is fixed on the outside of the central segment of the tube wall of the first tube.

24. The test arrangement according to claim 23, wherein the electronic test system is configured to provide the first electrical test system driver signal with a signal frequency corresponding to a mechanical resonance frequency of the vibronic module; and/or wherein the electronic test system is configured to provide the first electrical test system driver signal with an amplitude and/or frequency characteristic which simulates a disturbance of the vibronic module; and/or wherein the electronic test system is configured to provide the first electrical test system driver signal with an amplitude and/or frequency characteristic which simulates a disturbance of a measuring substance to be detected by means of the measuring system; and/or wherein the measuring system electronics is configured to calculate simulation measured values for at least one simulation variable simulating a disturbance of the vibronic module by means of the first test signal generated by means of the first electrical test system driver signal, in particular to compare it with simulation reference values corresponding to the first electrical test system driver signal and/or one or more threshold values predetermined therefor.

25. The test arrangement according to claim 12, wherein the base module is configured to receive the vibronic module if the test module is not inserted into the base module; and/or wherein the base module is configured to receive the test module if the vibronic module is not inserted into the base module; and/or wherein the vibronic module and the base module are configured to be assembled without tools; and/or wherein the test module and the base module are configured to be assembled without tools.

26. The test arrangement according to claim 21, wherein the second permanent magnet is fixed to the second tube.

27. The test arrangement according to claim 1, wherein the measuring system electronics and the test system electronics are configured to communicate with each other via a data line and/or by radio.

28. The test arrangement according to claim 1, wherein the measuring system electronics has at least one data output for outputting measuring system data.

29. The test arrangement according to claim 28, wherein a data input of the test system electronics is connected to the data output of the measuring system electronics.

30. The test arrangement according to claim 29, wherein the measuring system electronics is configured to transmit measuring system data, to the test system electronics via data output, and wherein the test system electronics are configured to receive and evaluate the measuring system data.

31. The test arrangement according to claim 29, wherein a data output of the test system electronics is connected to a data input of the measuring system electronics.

32. The test arrangement according to claim 31, wherein the test system electronics is configured to transmit test system data to the measuring system electronics via data output, and and wherein the measuring system electronics are configured to receive and evaluate the test system data.

33. The test arrangement according to claim 1, wherein the measuring system electronics has a radio unit, and wherein the test system electronics has a radio unit.

34. The test arrangement according to claim 1, wherein the measuring system electronics has at least one data input for receiving test system data and/or setting parameters and/or control commands generated internally by the test system electronics for the measuring system electronics.

35. The test arrangement according to claim 1, wherein the test module includes an identification element mechanically connected to the carrier element, and wherein the measuring system electronics is configured to read out information carried by the identification element of the test module.

36. The test arrangement according to claim 1, wherein the test module includes an environmental sensor mechanically connected to the carrier element and spaced apart from the first test element for detecting a physical environmental measurement variable within the base module and for converting the detected environmental measurement variable into an environmental measurement signal, wherein the test system electronics is configured to receive and evaluate the environmental measurement signal.

37. The test arrangement according to claim 1, wherein the test module is inserted into the base module such that the first test element is held at a first test position predetermined with respect to an orientation and/or a smallest distance to the first electrical coil forming a transmitter.

38. The test arrangement according to claim 1, wherein the test module is inserted into the base module such that the first test element is held at a first test position predetermined in accordance with an orientation and/or a smallest distance to the first electrical coil, forming a magnetic coil.

* * * * *